United States Patent
Wang et al.

(10) Patent No.: US 11,310,079 B2
(45) Date of Patent: Apr. 19, 2022

(54) EVPN PACKET PROCESSING METHOD, DEVICE, AND SYSTEM FOR MAC LEARNING VIA MAC/IP ADVERTISEMENT ROUTE

(71) Applicant: Huawei Technologies Co., Ltd., Shenzhen (CN)

(72) Inventors: Haibo Wang, Beijing (CN); Shunwan Zhuang, Beijing (CN); Qiao Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 16/570,807

(22) Filed: Sep. 13, 2019

(65) Prior Publication Data

US 2020/0014557 A1 Jan. 9, 2020

Related U.S. Application Data

(63) Continuation of application No. PCT/CN2017/115820, filed on Dec. 13, 2017.

(30) Foreign Application Priority Data

Mar. 14, 2017 (CN) .......................... 201710150686.6

(51) Int. Cl.
*H04L 12/46* (2006.01)
*H04L 12/751* (2013.01)
(Continued)

(52) U.S. Cl.
CPC .......... *H04L 12/4675* (2013.01); *H04L 45/02* (2013.01); *H04L 45/22* (2013.01);
(Continued)

(58) Field of Classification Search
CPC ..... H04L 12/4675; H04L 45/02; H04L 45/22; H04L 45/745; H04L 61/6022;
(Continued)

(56) References Cited

U.S. PATENT DOCUMENTS 8,953,590 B1   2/2015 Aggarwal et al.
9,397,931 B1 * 7/2016 Mohanty ................. H04L 45/48
(Continued)

FOREIGN PATENT DOCUMENTS

CN       104365066 A    2/2015
CN       105743689 A    7/2016
(Continued)

OTHER PUBLICATIONS

Machine Translation and Abstract of Chinese Publication No. CN109218178, Jan. 15, 2019, 54 pages.
(Continued)

*Primary Examiner* — Ian N Moore
*Assistant Examiner* — Rushil Parimal Sampat
(74) *Attorney, Agent, or Firm* — Conley Rose, P.C.

(57) ABSTRACT

A method includes a second provider edge (PE) device sending, to a first PE device, a media access control (MAC) route learned from a customer edge (CE) device, wherein the first PE device generates a MAC forwarding entry based on the MAC route, wherein the first PE device may forward, based on the MAC forwarding entry using the CE device, a packet whose destination MAC address is the CE device or a MAC address of a terminal device accessing the CE device, and wherein an outbound interface identifier included in the MAC forwarding entry is an identifier of an interface connected to the CE device.

23 Claims, 12 Drawing Sheets

(51) Int. Cl.
*H04L 12/707* (2013.01)
*H04L 12/741* (2013.01)
*H04L 29/12* (2006.01)
*H04L 29/06* (2006.01)
*H04L 45/02* (2022.01)
*H04L 45/00* (2022.01)
*H04L 45/745* (2022.01)
*H04L 101/622* (2022.01)

(52) U.S. Cl.
CPC ........ *H04L 45/745* (2013.01); *H04L 61/6022* (2013.01); *H04L 63/0272* (2013.01)

(58) Field of Classification Search
CPC . H04L 63/0272; H04L 12/4641; H04L 45/28; H04L 45/66; H04L 61/2007; H04L 45/50
See application file for complete search history.

(56) References Cited

U.S. PATENT DOCUMENTS

| | | | |
|---|---|---|---|
| 9,838,310 | B1* | 12/2017 | Sajassi ................ H04L 61/6022 |
| 2013/0148657 | A1 | 6/2013 | Salam et al. |
| 2015/0200848 | A1 | 7/2015 | Janakiraman et al. |
| 2016/0191374 | A1 | 6/2016 | Singh et al. |
| 2017/0201389 | A1* | 7/2017 | Tiruveedhula ........ H04L 45/745 |

FOREIGN PATENT DOCUMENTS

| | | |
|---|---|---|
| CN | 109218178 A | 1/2019 |
| EP | 2991284 A1 | 3/2016 |
| EP | 3041178 A1 | 7/2016 |

OTHER PUBLICATIONS

Sajassi, A., Ed., et al., "BGP MPLS Based Ethernet VPN," draft-ietf-l2vpn-evpn-11, Oct. 18, 2014, 52 pages.
Kekekeke, "[Huawei Yueduhui] Technology Enthusiast: EVN," retrieved from internet: https://support.huawei.com/huaweiconnect/enterprise/zh/thread-335619.html, Nov. 26, 2015, 65 pages.
Rosen, E., et al., "BGP/MPLS IP Virtual Private Networks (VPNs)," RFC 4364, Feb. 2006, 47 pages.
Sajassi, A., Ed., et al., "BGP MPLS-Based Ethernet Vpn," Rfc 7432, Feb. 2015, 56 pages.

* cited by examiner

EVPN PACKET PROCESSING METHOD, DEVICE, AND SYSTEM FOR MAC LEARNING VIA MAC/IP ADVERTISEMENT ROUTE

CROSS-REFERENCE TO RELATED APPLICATIONS

This application is a continuation of International Patent Application No. PCT/CN2017/115820, filed on Dec. 13, 2017, which claims priority to Chinese Patent Application No. 201710150686.6, filed on Mar. 14, 2017. The disclosures of the aforementioned applications are hereby incorporated by reference in their entireties.

TECHNICAL FIELD

This application relates to the field of communications technologies, and in particular, to an Ethernet virtual private network (EVPN) packet processing method, a device, and a system.

BACKGROUND

An Ethernet virtual private network (EVPN) is a virtual private network (VPN) technology that provides layer 2 network interconnection on a Multiprotocol Label Switching (MPLS) network. Currently, the EVPN is used as a mainstream solution for bearing a layer 2 service in network designs of major providers. In the EVPN technology, the Border Gateway Protocol (BGP) is used as a protocol of a control plane to perform Media Access Control (MAC) address learning between provider edge (PE) devices, and transfer MAC address learning and publishing processes from a conventional data plane to the control plane, thereby greatly reducing MAC address diffusion in traffic flooding, supporting a customer edge (CE) device being multi-homed to the EVPN, and facilitating MAC address management to implement load sharing. In the EVPN, the CE device may be connected to the PE device in a plurality of access manners. For example, the CE device is multi-homed to the EVPN through a virtual local area network (VLAN). One of important advantages of the EVPN solution is to implement multi-homing of the CE device.

In a common scenario, as shown in FIG. 1, a network 100 includes a backbone network and a plurality of EVPN sites provided by a service provider. The backbone network includes a first PE device PE 1, a second PE device PE 2, a third PE device PE 3, and a plurality of Provider (P) devices (not shown in the figure). The plurality of EVPN sites include a site 1 and a site 2. The site 1 and the site 2 belong to a same EVPN 1. A terminal device A whose MAC address is MAC 1 accesses a CE 1, and the CE 1 is dual-homed to the PE 1 and the PE 2. A terminal device B whose MAC address is MAC 2 accesses a CE 2, and the CE 2 accesses the PE 3. The PE 1 learns the MAC address of the terminal device A from the CE 1. The PE 2 does not learn the MAC address of the terminal device A from the CE 1. The PE 1 sends an EVPN Media Access Control/Internet Protocol (MAC/IP) Advertisement Route to the PE 3 using a BGP update message, in other words, notifies the PE 3 of a MAC route through which the terminal device A is reached. Although the PE 2 does not learn MAC 1, the PE 2 may publish an EPVN Ethernet auto-discovery route to the PE 3, and the PE 3 may know that both the PE 1 and the PE 2 can be used to arrive at the terminal device A. In other words, the PE 3 performs load sharing in an aliasing manner. It should be noted that, in FIG. 1, an example in which the terminal device A accesses a PE device using the CE 1 is used for description. In actual networking, the terminal device A may be directly used as a CE device to access the PE device. In this case, the MAC address of the terminal device A is a MAC address of the CE device. This specification is described using an example in which the terminal device A accesses a PE device using a CE device. A solution in which a terminal device directly accesses a PE device is similar to a solution in which a terminal device accesses a PE device using a CE device. Details are not described herein again.

For specific details about the MAC/IP advertisement route and the Ethernet A-D route, and details about load sharing by the PE 3 in an aliasing manner, refer to descriptions in the Request For Comments (RFC) 7432 published by the Internet Engineering Task Force (IETF). Details are not described herein again. However, in the existing EVPN technology, when known unicast traffic that is sent by the terminal device B and whose destination MAC address is MAC 1 arrives at the PE 3, the PE 3 performs load sharing processing on the known unicast traffic, and sends the known unicast traffic to the PE 2. Because the PE 2 does not learn the MAC address of the terminal device A from the CE 1, the PE 2 cannot directly forward the foregoing unicast traffic to the CE 1 and needs to send the traffic to the CE 1 using the PE 1. In other words, the PE 1 and the PE 2 do not effectively share load of the known unicast traffic whose destination MAC address is MAC 1. Consequently, bandwidth resources from the PE 2 to the CE 1 are wasted, and bandwidth resources from the PE 1 to the CE 1 are also consumed. In the foregoing solution, system resources are wasted, and a technical advantage of the EVPN cannot be effectively utilized.

SUMMARY

This application provides a packet processing method, in order to resolve a technical problem in other approaches where load cannot be effectively shared between a plurality of PE devices because one PE device cannot forward traffic to a CE device that is multi-homed to the plurality of PE devices (including the PE).

According to a first aspect, this application provides a packet processing method, applied to an EVPN. A customer edge (CE) device is connected to a first interface of a first provider edge (PE) device over a first link, and the CE device is connected to a second interface of the second PE device over a second link. First, the first PE device receives a first message sent by the second PE device. The first message carries a first Media Access Control/Internet Protocol (MAC/IP) advertisement route. The first MAC/IP advertisement route includes a MAC address and an Ethernet segment identifier (ESI) used to identify an Ethernet segment (ES). The MAC address included in the first MAC/IP advertisement route is a MAC address of the CE device or a MAC address of a terminal device managed by the CE device. The ES includes the first link and the second link. The first PE device determines, based on the ESI, that an interface through which the first PE device is connected to the CE device is the first interface. Further, the first PE device generates a first MAC forwarding entry based on the determined first interface and the MAC address included in the first MAC/IP advertisement route. The first MAC forwarding entry includes the MAC address included in the first MAC/IP advertisement route, an outbound interface identifier included in the first MAC forwarding entry is an identifier of the first interface, and the first MAC forwarding entry is used by the first PE device to forward, to the CE device, a packet whose destination MAC address is the MAC address included in the first MAC/IP advertisement route.

In the foregoing solution, when the first PE device does not learn a MAC route from the CE device, the second PE device notifies the first PE device of the MAC route learned from the CE. The first PE device can generate the first MAC forwarding entry based on the received MAC route. When receiving a data stream whose destination MAC address is the MAC address included in the first MAC/IP advertisement route, the first PE device may forward the data stream to the CE device over the first link based on the first MAC forwarding entry. When the terminal device accesses the first PE device using the CE device, the CE device forwards the data stream to the terminal device. In the foregoing technical solution, when a CE device is multi-homed to a plurality of PE devices in a multi-active manner, the plurality of PE devices can effectively share load, thereby properly utilizing bandwidth resources.

In an optional design, the first message further carries a next hop network address, and the next hop network address in the first message is a network address of the second PE device, for example, a loopback address of the second PE device. The method further includes: obtaining, by the first PE device, the network address of the second PE device based on the first message; and generating, by the first PE device, a second MAC forwarding entry based on the MAC address included in the first MAC/IP advertisement route and the network address of the second PE device. The second MAC forwarding entry includes the MAC address included in the first MAC/IP advertisement route, and a next hop network address included in the second MAC forwarding entry is the network address of the second PE device. When the first link is faulty, the second MAC forwarding entry is used by the first PE device to forward a packet whose destination MAC address is the MAC address included in the first MAC/IP advertisement route.

When the first PE device receives known unicast traffic bound for the terminal device (a data packet whose destination MAC address is the MAC address of the terminal device), the first PE device queries a MAC forwarding table; and directly forwards, according to an instruction of the first MAC forwarding entry when the second link is in a normal working state, the packet over the first link using the CE device. When the first link is faulty, and the first PE device receives the known unicast traffic bound for the terminal device (the data packet whose destination MAC address is the MAC address of the terminal device), the first PE device forwards the traffic to the second PE device according to an instruction of the second MAC forwarding entry, and the second PE device forwards the traffic to the CE device, thereby increasing a failure convergence speed.

In an optional design, the first message is a first Border Gateway Protocol update (BGP update) message.

In an optional design, after the receiving, by the first PE device, a first message sent by the second PE device, the method further includes: generating, by the first PE device, a second message, where the second message carries a second MAC/IP advertisement route and a next hop network address, the second MAC/IP advertisement route includes a MAC address and the Ethernet segment identifier (ESI), the MAC address included in the second MAC/IP advertisement route is the same as the MAC address included in the first MAC/IP advertisement route, and the next hop network address carried in the second message is a network address of the first PE device; and sending, by the first PE device, the second message to the second PE device, where the second message is used by the second PE device to generate a third MAC forwarding entry and a fourth MAC forwarding entry. The third MAC forwarding entry is used by the second PE device to forward a packet whose destination MAC address is the MAC address included in the second MAC/IP advertisement route, the third MAC forwarding entry includes the MAC address included in the second MAC/IP advertisement route, and an outbound interface identifier included in the third MAC forwarding entry is an identifier of the first interface. When the first link is faulty, the fourth MAC forwarding entry is used by the second PE device to forward a packet whose destination MAC address is the MAC address included in the second MAC/IP advertisement route, the fourth MAC forwarding entry includes the MAC address included in the second MAC/IP advertisement route, and a next hop network address included in the fourth forwarding entry is the network address of the first PE device.

According to the foregoing solution, after receiving the first message, the first PE device generates, on a control plane based on information carried in the first message, a local primary MAC routing entry and a local secondary MAC routing entry that is used for fast reroute. Further, the control plane delivers the primary MAC routing entry and the secondary MAC routing entry to a forwarding plane, and generates the first MAC forwarding entry and the second MAC forwarding entry that are used for fast reroute. In addition, after receiving the first message, the first PE device generates the local first MAC forwarding entry, and then returns the local MAC route to the second PE device, such that the second PE device generates a secondary MAC routing entry used to implement fast reroute. The MAC route learned by the second PE device from the CE device may be used as a local MAC route, namely, a primary MAC route. When a link that connects the second PE device and the CE device is faulty, for example, when the second link is faulty, the local MAC route of the second PE device is cancelled. After the first link recovers, the second PE device may generate the local MAC route again based on the second MAC/IP advertisement route notified by the first PE device, in order to instruct to forward traffic to the CE device. Therefore, after the second link is faulty and recovers again, a route can be quickly redirected, and fast failure convergence can be implemented.

It should be noted that, in this application, the local MAC route of the PE device is a route used to instruct to directly forward unicast traffic to the CE device, a destination MAC address included in the local MAC route is the MAC address of the CE device or a MAC address of a terminal device accessing the CE device, and an outbound interface identifier included in the local MAC route is an identifier of an interface, connected to the CE device, of the PE device.

In an optional design, the second message further carries instruction information, and the instruction information is used to instruct the second PE device not to send, to the first PE device after the second PE device receives the second message, a MAC/IP advertisement route through which the MAC address included in the second MAC/IP advertisement route is reached, in order to avoid a packet loop.

According to a second aspect, this application provides a packet processing method, and the method is applied to an EVPN. A customer edge CE device is connected to a first interface of a first provider edge PE device over a first link, and the CE device is connected to a second interface of a second PE device over a second link. The second PE device generates a first message, where the first message carries a first MAC/IP advertisement route through which the CE device is reached. The first MAC/IP advertisement route includes a MAC address and an ESI used to identify an ES. The MAC address included in the first MAC/IP advertisement route is a MAC address of the CE device or a MAC address of a terminal device managed by the CE device. The ES includes the first link and the second link. The second PE device sends the first message to the first PE device, where the first MAC/IP advertisement route is used by the first PE device to generate a first MAC forwarding entry. A destination MAC address included in the first MAC forwarding entry is the MAC address included in the first MAC/IP advertisement route, an outbound interface identifier included in the first MAC forwarding entry is an identifier of the first interface, and the first MAC forwarding entry is used by the first PE device to forward, to the CE device, a packet whose destination MAC address is the MAC address included in the first MAC/IP advertisement route.

In the foregoing technical solution, when the foregoing first PE device does not learn, from the CE device, a MAC route through which the CE device or a terminal device accessing the CE device is reached, the second PE device notifies the first PE device of the MAC route through which the CE device or the terminal device accessing the CE device is reached. The first PE device can generate the first MAC forwarding entry based on the received MAC route. When receiving a data stream whose destination MAC address is the MAC address included in the first MAC/IP advertisement route, the first PE device may directly forward the data stream to the CE device over the second link based on the first MAC forwarding entry. In the foregoing technical solution, when a CE device is multi-homed to a plurality of PE devices in a multi-active manner, the plurality of PE devices can effectively share load, thereby properly utilizing bandwidth resources.

In an optional design, the first message is a first Border Gateway Protocol update (BGP update) message.

In an optional design, after the second PE device sends the first message to the first PE device, the method further includes receiving, by the second PE device, a second message sent by the first PE device. The second message carries a second MAC/IP advertisement route and a next hop network address. The second MAC/IP advertisement route includes a destination MAC address and the Ethernet segment identifier (ESI). The destination MAC address in the second MAC/IP advertisement route is the MAC address included in the first MAC/IP advertisement route. The next hop network address carried in the second message is a network address of the first PE device, for example, a loopback address of the first PE device. The ESI is used by the second PE device to determine that an interface through which the second PE device is connected to the CE device is the second interface. The determined second interface and the destination MAC address included in the second MAC/IP advertisement route are used by the second PE device to generate a third MAC forwarding entry. A destination MAC address included in the third MAC forwarding entry is the MAC address included in the second MAC/IP advertisement route, an outbound interface identifier included in the third forwarding entry is an identifier of the second interface, and the third MAC forwarding entry is used by the second PE device to forward a packet whose destination MAC address is the MAC address included in the second MAC/IP advertisement route. The method further includes generating, by the second PE device, a fourth MAC forwarding entry based on the MAC address included in the second MAC/IP advertisement route and the network address of the first PE device. The fourth MAC forwarding entry includes the MAC address included in the second MAC/IP advertisement route, and a next hop network address included in the fourth MAC forwarding entry is the network address of the first PE device. When the second link is faulty, the fourth MAC forwarding entry is used by the second PE device to forward a packet whose destination MAC address is the MAC address included in the second MAC/IP advertisement route.

In the foregoing solution, after generating the third forwarding entry and the fourth forwarding entry, the second PE device implements fast reroute FRR based on the third MAC forwarding entry and the fourth MAC forwarding entry. When the second PE device receives known unicast traffic bound for the terminal device (a data packet whose destination MAC address is the MAC address of the terminal device), the second PE device queries a MAC forwarding table; and when the second link normally works, directly forwards the packet to the CE device using a network device according to an instruction of the third MAC forwarding entry. When the second link is faulty, after the second PE device receives the known unicast traffic bound for the terminal device (the data packet whose destination MAC address is the MAC address of the terminal device), the second PE device queries the MAC forwarding table, and forwards the traffic to the first PE device according to an instruction of a secondary forwarding entry, in other words, according to an instruction of the fourth MAC forwarding entry; and the first PE device forwards the traffic to the CE device, thereby increasing a failure convergence speed.

In an optional design, the second MAC routing message further carries instruction information. After the receiving, by the second PE device, a second message sent by the first PE device, the method further includes skipping sending, by the second PE device to the first PE device according to the instruction information, a MAC/IP advertisement route through which the MAC address included in the second MAC/IP Advertisement Route is reached (or the CE device or the terminal device accessing the CE device is reached). Therefore, a packet loop can be effectively avoided.

According to a third aspect, this application provides a first provider edge PE device, and the first PE device is configured to perform the method in any one of the first aspect or the possible designs of the first aspect. The first PE device includes modules configured to implement the method in any one of the first aspect or the possible designs of the first aspect.

According to a fourth aspect, this application provides a second provider edge PE device, and the second PE device is configured to perform the method in any one of the second aspect or the possible designs of the second aspect. The second PE device includes modules configured to implement the method in any one of the second aspect or the possible designs of the second aspect.

According to a fifth aspect, this application provides a first PE device, and the first PE device includes an input interface, an output interface, a processor, and a memory. The input interface, the output interface, the processor, and the memory may be connected to each other using a bus system. The memory is configured to store a program, and the processor is configured to execute the program in the memory, to perform the method in any one of the first aspect or the possible designs of the first aspect.

According to a sixth aspect, this application provides a second PE device, and the second PE device includes an input interface, an output interface, a processor, and a memory. The input interface, the output interface, the processor, and the memory may be connected to each other using a bus system. The memory is configured to store a program, and the processor is configured to execute the program, an instruction, or code in the memory, to perform the method in any one of the second aspect or the possible designs of the second aspect.

According to a seventh aspect, this application provides a first PE device, and the first PE device includes a main control board and an interface board, and may further include a switching board. The first PE device is configured to perform the method in any one of the first aspect or the possible designs of the first aspect.

According to an eighth aspect, an embodiment of this application provides a first PE device, and the first PE device includes a controller and a first PE forwarding device. The first PE forwarding device includes an interface board, and may further include a switching board. The first PE device is configured to perform the method in any one of the first aspect or the possible designs of the first aspect. The controller includes a receiver, a processor, a transmitter, a random access memory, a read-only memory, and a bus. The processor is separately coupled to the receiver, the transmitter, the random access memory, and the read-only memory using the bus. When the controller needs to run, a basic input/output system built into the read-only memory or a bootloader in an embedded system is used to boot the system to start, and boot the controller to enter a normal running state. After entering the normal running state, the controller runs an application and an operating system in the random access memory, such that the processor executes functions of the main control board in the seventh aspect.

According to a ninth aspect, this application provides a second PE device, and the second PE device includes a main control board and an interface board, and may further include a switching board. The second PE device is configured to perform the method in any one of the second aspect or the possible designs of the second aspect.

According to a tenth aspect, an embodiment of this application provides a second PE device, and the second PE device includes a controller and a second PE forwarding device. The second PE device forwarding device includes an interface board, and may further include a switching board. The second PE device is configured to perform the method in any one of the second aspect or the possible designs of the second aspect. The controller includes a receiver, a processor, a transmitter, a random access memory, a read-only memory, and a bus. The processor is separately coupled to the receiver, the transmitter, the random access memory, and the read-only memory using the bus. When the controller needs to run, a basic input/output system built into the read-only memory or a bootloader in an embedded system is used to boot the system to start, and boot the controller to enter a normal running state. After entering the normal running state, the controller runs an application and an operating system in the random access memory, such that the processor executes functions of the main control board in the ninth aspect.

According to an eleventh aspect, an embodiment of this application provides a communications system, and the communications system includes the first PE device according to any one of the third aspect, the fifth aspect, the seventh aspect, or the eighth aspect, and the second PE device according to any one of the fourth aspect, the sixth aspect, the ninth aspect, or the tenth aspect.

According to a twelfth aspect, an embodiment of this application provides a computer readable storage medium or a computer program product, configured to store a computer program. The computer program is configured to perform the method in any one of the first aspect, the second aspect, the possible designs of the first aspect, or the possible designs of the second aspect.

BRIEF DESCRIPTION OF DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings without creative efforts.

DESCRIPTION OF EMBODIMENTS

The following describes technical solutions of the embodiments in this application with reference to accompanying drawings. Network architectures and service scenarios described in the embodiments of this application aim to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application can also be applied to resolve a similar technical problem.

The technical solutions described in this application may be applied to a BGP MPLS-based EVPN. In the EVPN technology, a mechanism similar to a BGP/MPLS Internet Protocol (IP) VPN is used. The BGP protocol is extended, and extended reachability information is used, such that MAC address learning and publishing processes between layer 2 networks of different sites are transferred from a data plane to a control plane. A MAC address is learned on the control plane to implement an L2VPN function. Learning the MAC address on the control plane can resolve problems caused by learning the MAC address on the data plane, such as difficult implementation of network device multi-homing and unsupported load sharing.

A CE device may be multi-homed to the EVPN over an Ethernet link. Multi-homing of one CE device in deployment means that the CE device is separately connected to a plurality of network-side devices over a plurality of links.

Figure 1:
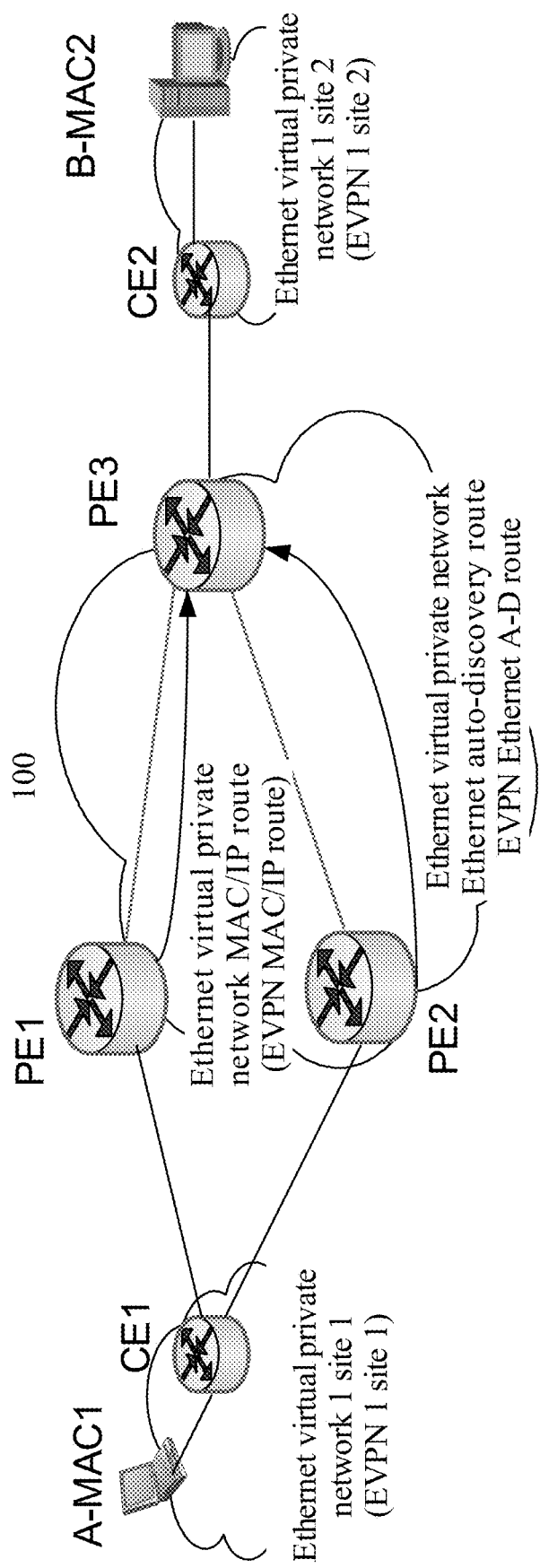
FIG. 1 is a schematic diagram of an EVPN application scenario.
Figure 2:
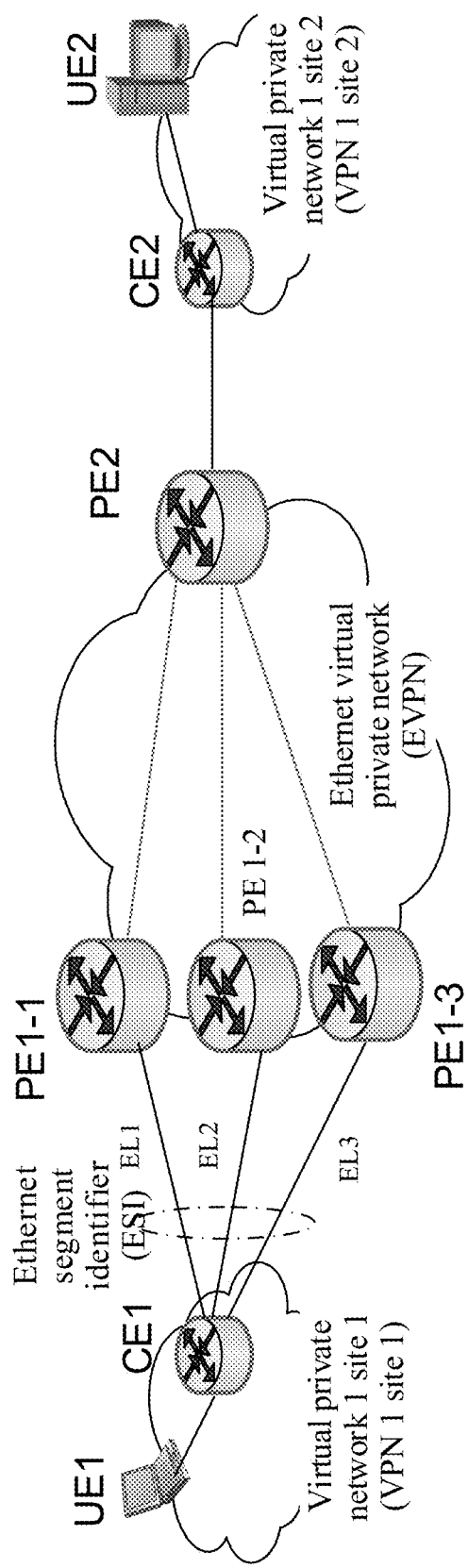
FIG. 2 is a schematic diagram of an application network scenario of a packet processing method according to an embodiment of this application.

FIG. 2 illustrates a typical scenario of multi-homing to an EVPN over Ethernet links in a multi-active manner. As shown in FIG. 2, the EVPN includes four PE devices: a PE 1-1, a PE 1-2, a PE 1-3, and a PE 2. A CE 1 is connected to the PE 1-1, the PE 1-2, and the PE 1-3 over an Ethernet link (EL) 1, an EL 2, and an EL 3 respectively. One group of Ethernet links including the three Ethernet links is an Ethernet segment (ES). An Ethernet segment identifier (ESI) is a unique non-zero identifier used to identify the ES. The PE 1-1 learns a MAC address of user equipment (UE) 1 in a site 1 of a VPN 1, for example, MAC A. The PE 1-1 publishes a MAC/IP advertisement route to the PE 2 using a BGP update message. The PE 1-2 does not learn the MAC address of the UE 1. The PE 1-2 publishes an Ethernet auto-discovery route (Ethernet A-D route) to the PE 2. Therefore, the PE 2 knows, in an aliasing manner, that the PE 2 may reach the UE 1 using the PE 1-1, and that the PE 2 may reach the UE 1 using the PE 1-2. Therefore, when unicast traffic sent by UE 2 to the UE 1 is transmitted by the PE 2, the PE 2 may perform load sharing processing on the unicast traffic. The unicast traffic is forwarded to the CE 1 using the PE 1-1 and the PE 1-2, thereby implementing interworking between the UE 1 and the UE 2 in the VPN 1.

In the deployment scenario of multi-homing over Ethernet links, the EVPN supports a plurality of redundancy modes. The plurality of redundancy modes include a single-active redundancy mode, a multi-active redundancy mode, and an all-active redundancy mode. The single-active redundancy mode (a single-active mode for short) indicates that only one Ethernet link in an Ethernet link segment is in an active state, and one or more other Ethernet links are in an inactive state. The active state means that the Ethernet link may be used to carry and forward a data stream. In a primary/secondary protection scenario, the active Ethernet link is usually used as a primary Ethernet link. Correspondingly, the Ethernet link may be in an inactive state. The inactive state means that the Ethernet link cannot be used to carry or forward a data stream, and the inactive Ethernet link is usually used as a secondary Ethernet link. When the primary Ethernet link is faulty, the secondary Ethernet link becomes active to carry and forward a data stream. Therefore, a deployment scenario in the single-active mode may include single-active deployment (only one EL exists in the ES), single-active single-standby deployment (two ELs exist in the ES, one EL is in an active state, and the other EL is in an inactive state), and single-active multi-standby deployment (at least three ELs exist in the ES, one EL is in an active state, and at least two other ELs are in an inactive state). Further explanations are provided with reference to FIG. 2. If only one Ethernet link EL 1 in the ES is active and used as a primary EL, and other EL 2 and EL 3 are inactive and used as backup ELs, such a redundancy mode is a single-active dual-standby mode (belonging to a single-active multi-standby mode).

In the deployment scenario of multi-homing over Ethernet links, the all-active redundancy mode (an all-active mode for short) indicates that all Ethernet links in an Ethernet link segment are in an active state. In other words, there is no inactive Ethernet link. All the active Ethernet links may forward a data stream in a load sharing manner, in order to provide a transmission capability with higher bandwidth. However, backup is not supported in a scenario of the all-active mode. In other words, there is no secondary Ethernet link. When one or more primary Ethernet links are faulty, no secondary Ethernet links can be used for redundancy protection. Further explanations are provided with reference to FIG. 2. If all three Ethernet links EL 1, EL 2, and EL 3 in the ES are active and no backup EL exists, such a redundancy mode is the all-active mode.

In the deployment scenario of multi-homing over Ethernet links, the multi-active redundancy mode indicates that some Ethernet links in an Ethernet link segment are in an active state, and the other Ethernet links are in an inactive state. These active Ethernet links (used as primary Ethernet links) may forward a data stream in a load sharing manner, to provide a transmission capability with higher bandwidth. The other inactive Ethernet links are used as backup Ethernet links. When one or more primary Ethernet links are faulty, these secondary Ethernet links may become active for redundancy protection. Further explanations are provided with reference to FIG. 2. If two Ethernet links EL 1 and EL 2 in the ES are in an active state, and an EL 3 is in an inactive state, the EL 1 and the EL 2 are combined to forward a data stream in a load sharing manner, and the EL 3 provides the EL 1 or the EL 2 with backup protection.

For details about the MAC/IP advertisement route and the Ethernet A-D route and for a method in which the PE 2 performs load sharing in an aliasing manner, refer to the RFC 7432. Related content of this document is incorporated in this application by reference. For brevity, details are not described herein again.

In the scenario shown in FIG. 2, traffic sent by a CE device to a PE device is routed using a hash algorithm, and implementation of the hash algorithm depends on the CE device. An implementation of the CE device cannot ensure that the traffic flows through each link that connects the CE device and the PE device. For an unselected link, a PE device corresponding to the link cannot learn a MAC address of a terminal device accessing the CE device, and cannot effectively obtain VLAN information of the terminal device. For example, when the CE device uses a source MAC address and a destination MAC address as hash factors, the traffic sent by the CE device to the PE device may be hashed to a link connected to the PE 1-1. Consequently, the PE 1-2 cannot learn the MAC address of the UE 1, and no local MAC forwarding entry reaching the UE 1 exists on the PE 1-2. When unicast traffic whose destination MAC address is MAC A reaches the PE 1-2, the PE 1-2 cannot directly forward the unicast traffic to the CE 1.

It should be noted that a person skilled in the art should understand that the scenario shown in FIG. 2 is merely an example and should not constitute a limitation on this application. As shown in FIG. 2, a terminal device accesses the PE device using the CE device. In an actual operation, the terminal device may alternatively serve as a CE device to access the PE device. In this case, a MAC address of the terminal device is a MAC address of the CE device. The scenario shown in FIG. 2 may be applied to a plurality of scenarios, for example, may be applied to a mobile bearer network. A typical mobile bearer network is an Internet Protocol radio access network (IP RAN). In the mobile bearer network, the CE device may be a base transceiver station (BTS), and the PE device may be connected to a base station controller (BSC) or a radio network controller (RNC). For another example, the EVPN VXLAN is applied to a fixed network. In the fixed network, the CE device may be a user-side site, and the PE device may be a broadband access server (BAS).

It should be further noted that, in this application, the CE device and the PE device in this embodiment of this application may be corresponding devices defined in the RFC 7432. The PE device may be a router or a switch, and the CE device may be a router, a switch, or a terminal device. When the CE device is a router, the CE device may be connected to one or more terminal devices. Usually, one side of the CE device is connected to the PE device, and another side is connected to UE, thereby transiting and connecting the user equipment to a provider network. The UE is also referred to as terminal equipment (TE) or a terminal, and may be a handheld device having a wireless communication function, an in-vehicle device, a wearable device, a computer device, a virtual machine, or another processing device connected to a wireless modem. The UE may alternatively be user equipment or a mobile station (MS).

It should be further noted that a PE and a PE device mean the same in the embodiments of this application. Likewise, a CE and a CE device mean the same. The data stream in this application may be a known unicast data stream.

Figure 3:
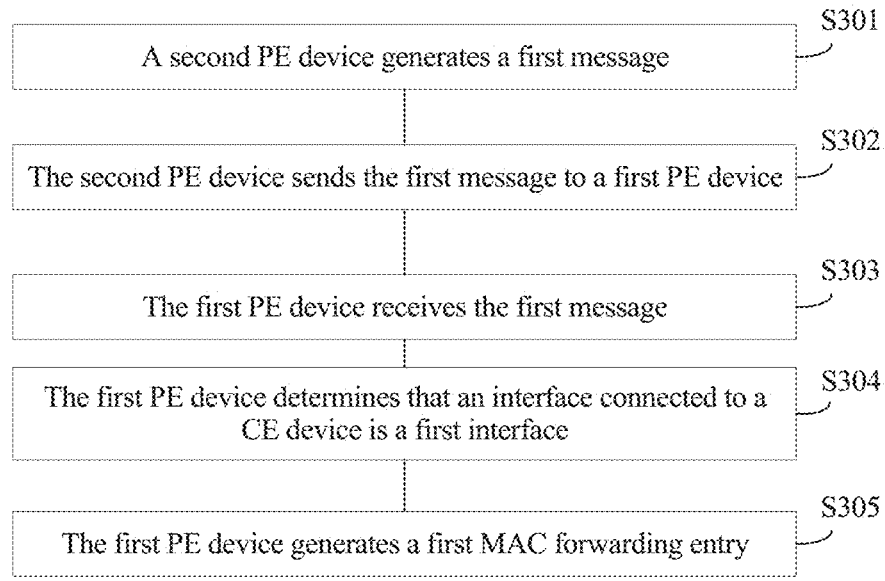
FIG. 3 is a schematic flowchart of another packet processing method according to an embodiment of this application.

FIG. 3 shows a packet processing method 300 provided in this application. The method is applied to an EVPN scenario in which a customer edge CE device separately accesses at least two PE devices over at least two links. The at least two links form one Ethernet segment, and the at least two PE devices include a first PE device and a second PE device. It should be noted that, in this application, the link may be an Ethernet link, and an identifier used to identify the Ethernet segment is an ESI. The Ethernet segment may also be referred to as an Ethernet link segment or an Ethernet link set. The CE device accesses a first interface of the first PE device over a first link. The CE device accesses a second interface of the second PE device over a second link. The Ethernet segment includes the first link and the second link.

The method 300 shown in FIG. 3 may be applied to the scenario shown in FIG. 2. The CE device may be, for example, the CE 1 shown in FIG. 2, the first PE device may be, for example, the PE 1-2 shown in FIG. 2, and the second PE device may be, for example, the PE 1-1 shown in FIG. 2. The method 300 includes S301 to S305.

S301. The second PE device generates a first message.

The first message carries a first Media Access Control/Internet Protocol (MAC/IP) advertisement route through which the CE device is reached. The first MAC/IP advertisement route includes a MAC address and an ESI used to identify an ES. The MAC address included in the first MAC/IP advertisement route is a MAC address of the CE device or a MAC address of a terminal device managed by the CE device. The first message further includes a next hop network address, and the next hop network address is a network address of the second PE device, for example, a loopback address of the second PE device. It should be noted that the loopback address in this application is an IP address configured on a loopback interface of a network device (such as a router or a switch), and is usually used as a network device identifier (for example, an IPv4 address with a 32-bit mask: 10.10.1.1/32). This can be understood by a person skilled in the art. In an implementation, the second PE device receives, through the second interface, a packet sent by the CE device over the second link, and the packet carries the MAC address of the CE device or the MAC address of the terminal device managed by the CE device. The second PE device obtains the MAC address included in the first MAC/IP advertisement route from the packet. The second PE device determines the ESI based on the second interface. The second PE device may include a plurality of interfaces. The plurality of interfaces may be a plurality of Ethernet interfaces. The second PE device may store configuration information of each interface of the second PE device. The configuration information of the second interface includes the ESI. In other words, the second interface corresponds to the ESI. The second PE device may determine the ESI based on the correspondence between the second interface and the ESI.

S302. The second PE device sends the first message to the first PE device.

The second PE device sends the first message to the first PE device. The first MAC/IP advertisement route is used by the first PE device to generate a first MAC forwarding entry. The first MAC forwarding entry includes the MAC address included in the first MAC/IP advertisement route, an outbound interface identifier included in the first MAC forwarding entry is an identifier of the first interface, and the first MAC forwarding entry is used by the first PE device to forward, to the CE device, a packet whose destination MAC address is the MAC address included in the first MAC/IP advertisement route.

It should be noted that, in this application, the second PE device can learn the MAC address included in the first MAC/IP advertisement route from the CE, and the first PE device cannot learn the MAC address included in the first MAC/IP advertisement route from the CE.

Figure 4A:
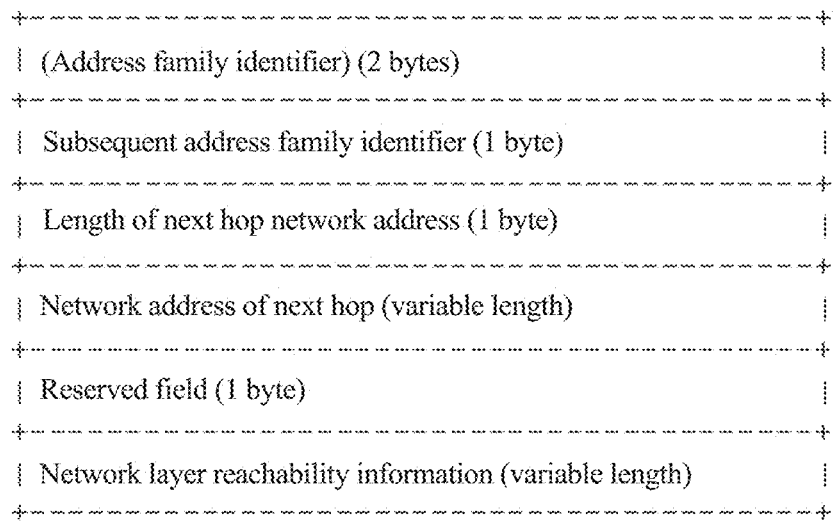
FIG. 4A is a schematic diagram of a format of an MP_REACH_NLRI attribute field in a BGP update message according to an embodiment of this application.
Figure 4B:
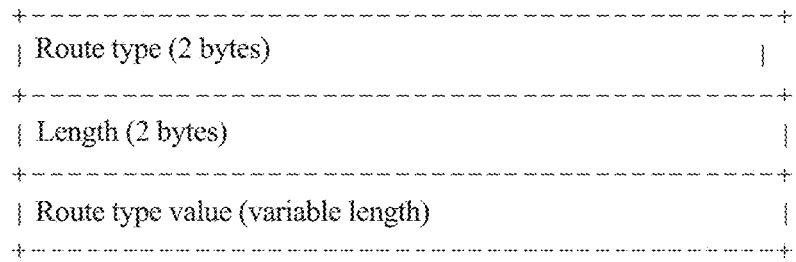
FIG. 4B is a schematic diagram of an EVPN NLRI field format according to an embodiment of this application.
Figure 4C:
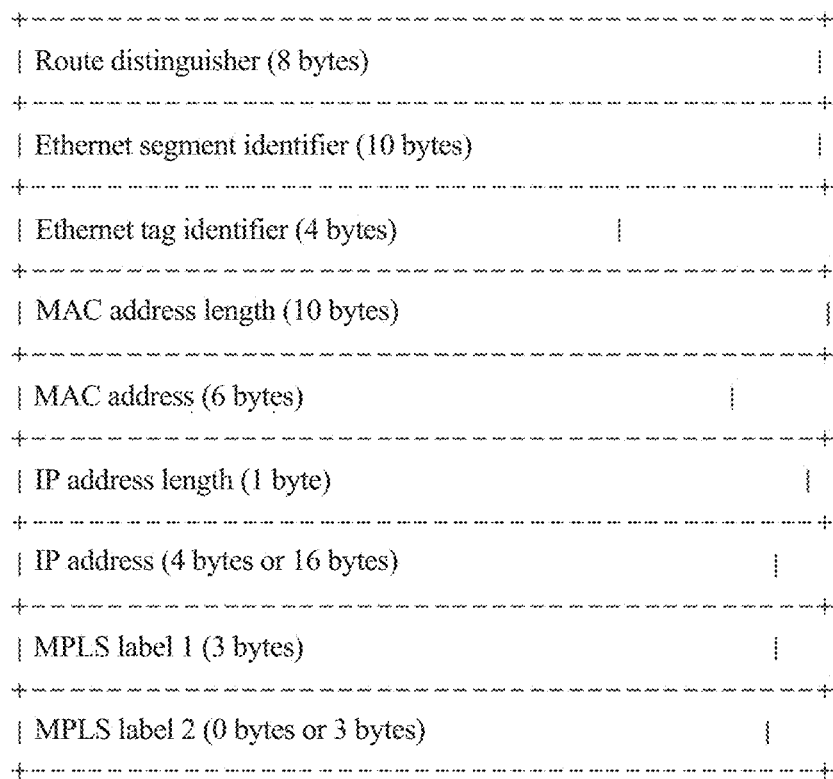
FIG. 4C is a schematic diagram of an EVPN MAC/IP advertisement route field format according to an embodiment of this application.
Figure 5:
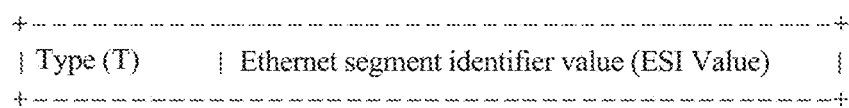
FIG. 5 is a schematic diagram of an ESI field format according to an embodiment of this application.

In an implementation, the first message is a Border Gateway Protocol (BGP) update message (which may also be referred to as a BGP update packet). In this application, the BGP update message is referred to as a first BGP update message. The first BGP update message carries the first MAC/IP advertisement route. The MAC/IP advertisement route belongs to a route type in EVPN network layer reachability information (NLRI) defined in the BGP protocol, and is used to instruct to forward unicast traffic. The EVPN NLRI is carried in a multiprotocol reachable network layer reachability information (MP_REACH_NLRI) attribute. The MP_REACH_NLRI attribute is an attribute defined in the BGP update message, and an example format is shown in FIG. 4A. The attribute includes an address family identifier (AFI) field and a subsequent address family identifier (SAFI) field. A value of the AFI field is used to indicate an L2VPN. For example, the value of the AFI field is 25. A value of the SAFI field is used to indicate the EVPN. For example, the value of the SAFI field is 70. The MP_REACH_NLRI attribute further includes a length of a next hop network address and a network address of next hop field. The network address of next hop field is used to carry the next hop network address (such as a loopback address). The MP_REACH_NLRI attribute further includes an NLRI field. With reference to the EVPN in the L2VPN indicated by values of the AFI and the SAFI, the NLRI field is an EVPN NLRI field. As shown in FIG. 4B, the EVPN NLRI field includes, for example, a route type field of 2 bytes, a length field of 2 bytes, and a route type specific field of a variable length. It should be noted that this application imposes no specific limitation on lengths of the route type field and the length field. The route type includes the MAC/IP advertisement route. For example, a value of the route type is 2. The route type specific field is used to carry details of the MAC/IP advertisement route. As shown in FIG. 4C, the MAC/IP advertisement route includes a route distinguisher (RD) field of 8 bytes, an Ethernet segment identifier (ESI) field of 10 bytes, an Ethernet tag identifier (Tag ID) field of 4 bytes, a MAC address length field of 1 byte, a MAC address field of 6 bytes, a length of next hop network address field of 1 byte, a network address of next hop field of 0 bytes or 4 bytes or 16 bytes, an MPLS label 1 field of 3 bytes, and an MPLS label 2 field of 0 bytes or 3 bytes. The MPLS label 2 is used to instruct to forward layer 3 traffic. A format of the ESI field in FIG. 4C is shown in FIG. 5, and includes a type (T) field and an ESI value field. The type field is used to indicate an ESI generation manner. Two common generation manners are Type 0 and Type 1, Type 0 indicates generation through manual configuration, and Type 1 indicates running the Link Aggregation Control Protocol (LACP) between a PE and a CE. A value of the ESI value field ranges from 0 to 0xFF, where "0x" indicates hexadecimal. For generation and configuration of the ES and the ESI, refer to descriptions in Chapter 5 in the RFC 7432. For definitions of the BGP update message and the MP_REACH_NLRI attribute, refer to descriptions in the RFC 476. For a definition of the EVPN NLRI field, refer to descriptions in the RFC 7432.

S303. The first PE device receives the first message sent by the second PE device.

S304. The first PE device determines that an interface connected to the CE device is the first interface.

In an implementation, in the EVPN, when a plurality of PE devices are connected to a same CE device, interfaces configured to connect the CE device are provided with a same ESI. The CE device is multi-homed to the first PE device and the second PE device through E-TRUNK. It is equivalent to that the CE device is connected to one PE device. The first PE device and the second PE device each include a plurality of interfaces. The first PE device is connected to the CE device through the first interface, and the second PE device is connected to the CE device through the second interface. The first PE device stores configuration information of the first interface. The second PE device stores the configuration information of the second interface. The configuration information of the first interface includes the ESI. The configuration information of the second interface includes the ESI. The ESI configured for the first interface is the same as the ESI configured for the second interface. Therefore, after receiving the first message, the first PE device obtains the first MAC/IP advertisement route carried in the first message. The first PE device extracts the ESI carried in the first MAC/IP advertisement route, to obtain the ESI. The first PE device determines, based on the ESI, that the interface connected to the CE device is the first interface. The first PE device may include a plurality of interfaces. The plurality of interfaces may be a plurality of Ethernet interfaces. The first PE device may store configuration information of each interface of the first PE device. The configuration information of the first interface includes the ESI. In other words, the first interface corresponds to the ESI. The first PE device may use the ESI carried in the first MAC/IP advertisement route as a search keyword, to search the configuration information of the plurality of interfaces stored in the first PE device for configuration information including the ESI. When the first PE device finds the configuration information including the ESI, the first PE device may determine, based on the correspondence between the first interface and the ESI, that an interface through which the first PE device is connected to the CE device is the first interface.

S305. The first PE device generates a first MAC forwarding entry.

The first PE device generates the first MAC forwarding entry based on the determined first interface and the MAC address included in the first MAC/IP advertisement route. The first MAC forwarding entry is used by the first PE device to forward, to the CE device, the packet whose destination MAC address is the MAC address included in the first MAC/IP advertisement route. A destination MAC address included in the first MAC forwarding entry is the MAC address included in the first MAC/IP advertisement route, and the outbound interface identifier included in the first MAC forwarding entry is the identifier of the first interface. For example, after receiving a data stream (known unicast data stream) whose destination MAC address is the MAC address included in the first MAC/IP advertisement route, the first PE device forwards a packet in the data stream to the CE device through the determined first interface based on the first MAC forwarding entry.

In an implementation, the first PE device receives a first packet whose destination MAC address is the MAC address included in the first MAC/IP advertisement route. The first PE device determines, by searching the first MAC forwarding entry, that the first interface is an outbound interface for forwarding the first packet. After all forwarding processing actions are completed, the first packet is forwarded to the CE device through the first interface. It should be noted that, in the embodiments of this application, the CE device accesses the PE device through virtual local area network (VLAN) transparent transmission. In other words, when the PE device receives a packet sent by the CE device or sends a packet to a CE device, VLAN information carried in the packet is directly and transparently transmitted without a change.

In the foregoing technical solution, when the first PE device does not learn a MAC route from the CE device, the second PE device notifies the first PE device of the MAC route through which the MAC address included in the first MAC/IP advertisement route is reached. The first PE device may generate the first MAC forwarding entry based on the received MAC route. When receiving a data stream whose destination MAC address is the MAC address included in the first MAC/IP advertisement route, the first PE device may forward the data stream to the CE device over the first link based on the first MAC forwarding entry. In addition, when the MAC address included in the first MAC/IP advertisement route is a MAC address of a terminal device accessing the CE device, the data stream is forwarded to the terminal device using the CE device. In the foregoing technical solution, when a CE device is multi-homed to a plurality of PE devices in a multi-active manner, the plurality of PE devices can effectively share load, thereby properly utilizing bandwidth resources.

Figure 6:
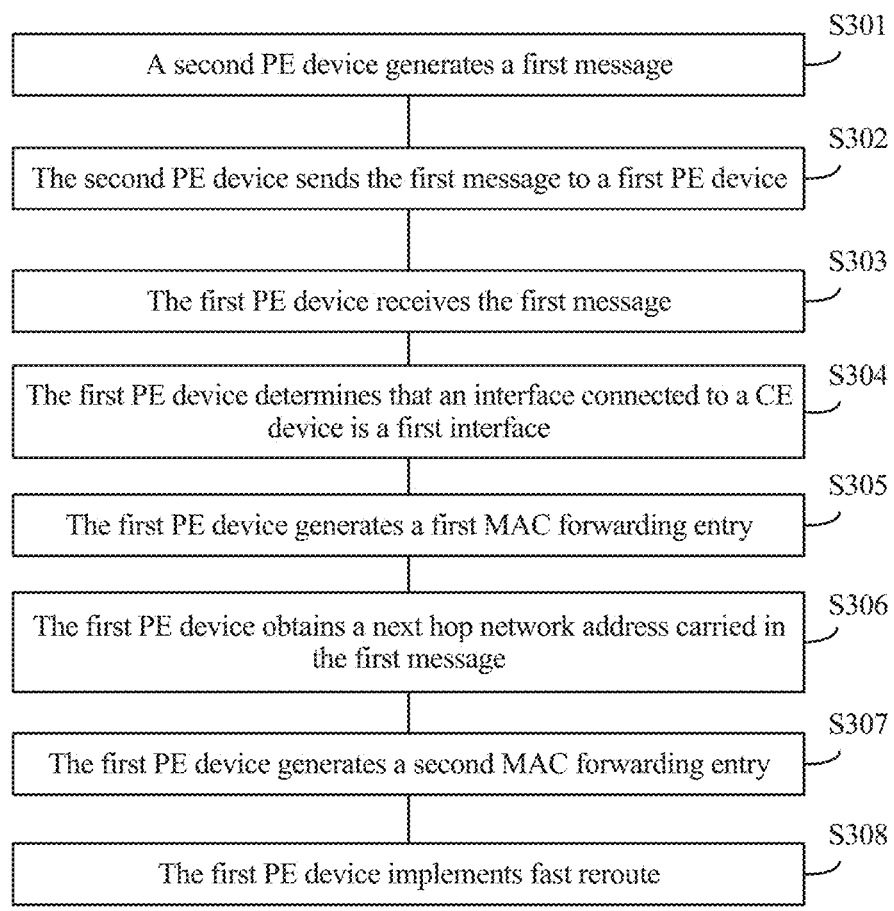
FIG. 6 is a schematic flowchart of another packet processing method according to an embodiment of this application.

In an implementation, after S305, the method 300 may further include S306 to S308. As shown in FIG. 6, the method 300 includes S301 to S308.

For related descriptions of S301 to S305, refer to the foregoing embodiment. Details are not described herein again.

S306. The first PE device obtains a next hop network address carried in the first message.

The next hop network address may be referred to as a first next hop network address, and the first next hop network address is the network address of the second PE device, for example, the loopback address of the second PE device.

S307. The first PE device generates a second MAC forwarding entry.

The first PE device generates the second MAC forwarding entry based on the MAC address included in the first MAC/IP advertisement route and the network address of the second PE device. The second MAC forwarding entry includes the MAC address included in the first MAC/IP advertisement route, and a next hop network address included in the second MAC forwarding entry is the network address of the second PE device.

In an implementation, the first PE device receives, through a third interface Intf1, the first message sent by the second PE device, and the first PE device uses the second PE device as a next hop node bound for the terminal device. A control plane (for example, a control board) of the first PE device generates a MAC routing entry (as shown in Table 1), a destination MAC address of the MAC routing entry is the MAC address included in the first MAC/IP advertisement route, and a next hop network address is the loopback address of the second PE device. Then the first PE device generates the second MAC forwarding entry (as shown in Table 2) based on the MAC routing entry, and sends the second MAC forwarding entry to a forwarding plane (for example, a forwarding board) of the first PE device. When the first PE device generates the second MAC forwarding entry based on the MAC routing entry, the first PE device may determine a destination MAC address and an outbound interface in the second MAC forwarding entry based on the MAC routing entry. The destination MAC address of the second MAC forwarding entry is a destination address in the MAC routing entry. The outbound interface of the second MAC forwarding entry is the third interface Intf1. That the first PE device determines Intf1 as the outbound interface in the second MAC forwarding entry may include the following steps: First, the first PE device uses the loopback address of the second PE device in the MAC routing entry as a search keyword, to search a mapping table (an FTN mapping table or an FTN forwarding table) between a forwarding equivalence class (FEC) to a next hop label forwarding entry (NHLFE) to learn that an outbound interface corresponding to the loopback address of the second PE device is a tunnel identifier (Tunnel ID) of a tunnel from the first PE device to the second PE device; and then uses the tunnel ID to search a tunnel forwarding table, to learn that an outbound interface corresponding to the tunnel ID is Intf1 (to be more specific, an interface, on the first PE device, of the tunnel from the first PE device to the second PE device). The first PE device determines Intf1 as the outbound interface in the second MAC forwarding entry. It should be noted that the tunnel may be a label switched path (LSP) tunnel, or may be a Resource Reservation Protocol-traffic engineering (RSVP-TE) tunnel, or the like. The tunnel is used to carry a known unicast data stream, and is not shown in FIG. 2 in this embodiment of the present disclosure for brevity. This can be understood by a person skilled in the art.

TABLE 1

MAC routing table

| Destination MAC | Next hop network address list |
| --- | --- |
| MAC address of a terminal device | Loopback address of the second PE device |

TABLE 2

MAC forwarding table

| Destination MAC | Outbound interface list |
| --- | --- |
| MAC address of a terminal device | Intf1 |

S308. The first PE device implements fast reroute (FRR) based on the first MAC forwarding entry and the second MAC forwarding entry. The first MAC forwarding entry is used as a primary forwarding entry, and the second MAC forwarding entry is used as a secondary forwarding entry.

When the first PE device receives known unicast traffic (a data packet whose destination MAC address is the MAC address included in the first MAC/IP advertisement route), the first PE device queries a MAC forwarding table; and directly forwards, according to an instruction of the first MAC forwarding entry when the first link is in a normal working state, the packet over the first link using the CE device. When the first link is faulty and the first PE device receives the known unicast traffic (the data packet whose destination MAC address is the MAC address included in the first MAC/IP advertisement route), the first PE device forwards the traffic to the second PE device according to an instruction of the second MAC forwarding entry, and the second PE device forwards the traffic to the CE device, thereby increasing a failure convergence speed.

Figure 7:
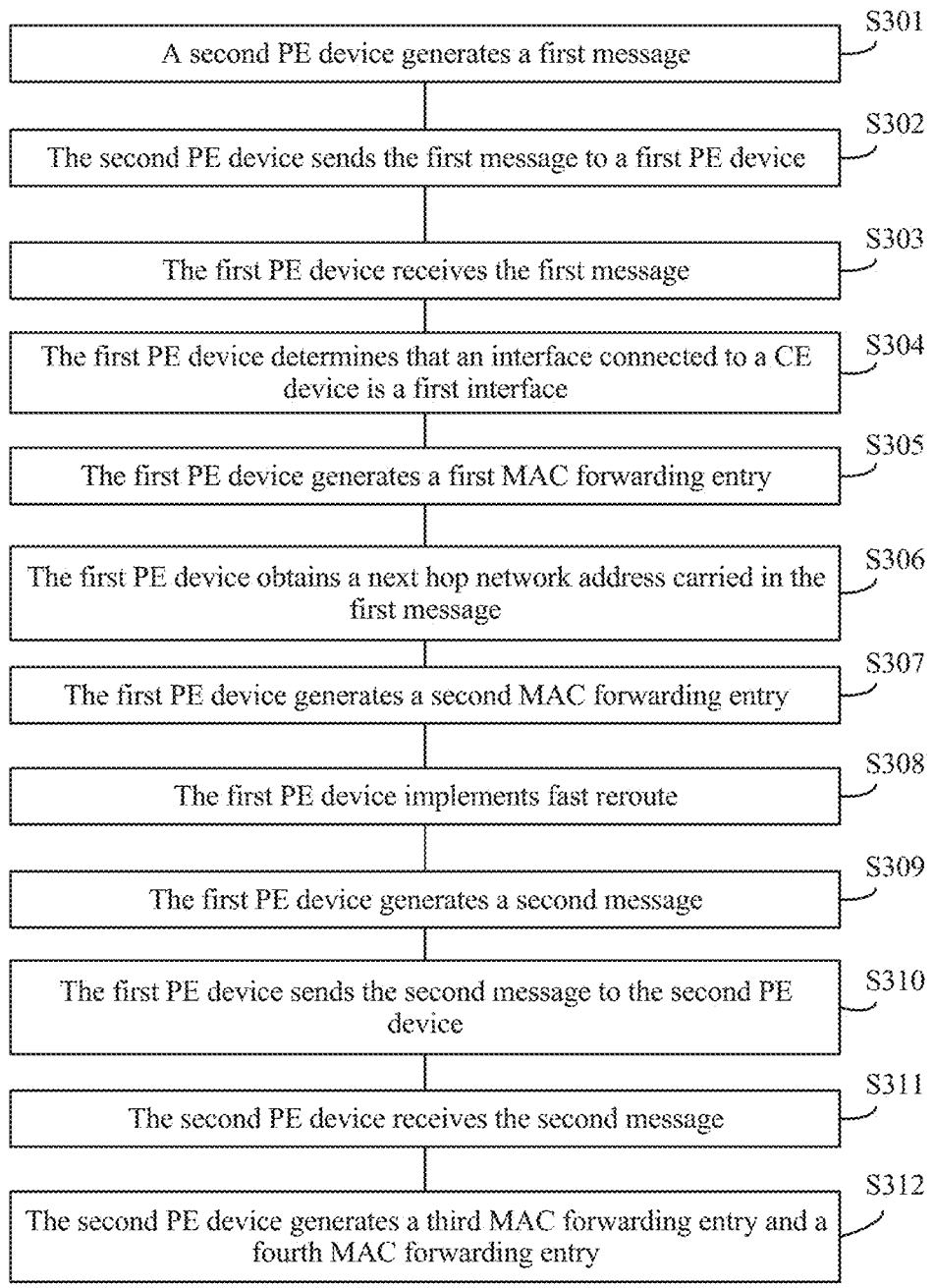
FIG. 7 is a schematic flowchart of another packet processing method according to an embodiment of this application.

Optionally, after S305, the method 300 may further include S309 to S312. The following describes the method 300 with reference to FIG. 7.

For related descriptions of S301 to S305, refer to the foregoing embodiment. Details are not described herein again.

S309. The first PE device generates a second message.

In an implementation, after receiving the first message sent by the second PE device, the first PE device generates the second message. The second message is used to carry a second MAC/IP advertisement route and a next hop network address, and the second MAC/IP advertisement route includes a destination MAC address and the ESI. The destination MAC address included in the second MAC/IP advertisement route is the same as the MAC address included in the first MAC/IP advertisement route. The first PE device generates the second message based on the first message. The first PE device obtains, based on the received first message, the MAC address carried in the first MAC/IP advertisement route, and encapsulates the second MAC address into the MAC/IP advertisement route. The next hop network address carried in the second message is a network address of the first PE device, for example, a loopback address of the first PE device.

S310. The first PE device sends the second message to the second PE device.

In an implementation, the second message is a BGP update message. In this application, the BGP update message is referred to as a second BGP update message. The second BGP update message carries the second MAC/IP advertisement route. For related descriptions of a format of the second BGP update message and a format of the second MAC/IP advertisement route, refer to descriptions of the format of the first BGP update message and the format of the first MAC/IP advertisement route in S202. Details are not described herein again.

In an implementation, the second message further carries instruction information, and the instruction information is used to instruct the second PE device not to send, to the first PE device after the second PE device receives the second message, a MAC/IP advertisement route through which the MAC address included in the second MAC/IP advertisement route is reached, to avoid a loop. The second message includes a flag field, used to carry the instruction information. A length of the flag field may be, for example, one bit or one byte. This application imposes no limitation thereto. Optionally, a new field may further be defined in the second message, for example, a flag field used to carry the instruction information. This application imposes no specific limitation thereto. The MAC/IP advertisement route through which the MAC address included in the second MAC/IP advertisement route is reached is used to instruct to forward a packet whose destination MAC address is the MAC address of CE device or the MAC address of the terminal that accesses the CE device.

S311. The second PE device receives the second message sent by the first PE device.

S312. The second PE device generates a third MAC forwarding entry and a fourth MAC forwarding entry.

In an implementation, after receiving the second message, the second PE device generates the third MAC forwarding entry based on the MAC address and the ESI that are included in the second MAC/IP advertisement route carried in the second message. The third MAC forwarding entry is used by the second PE device to forward a packet whose destination MAC address is the MAC address included in the second MAC/IP advertisement route, and an outbound interface identifier included in the third MAC forwarding entry is an identifier of the second interface. A manner in which the second PE device generates the third MAC forwarding entry is similar to the manner in which the first PE device generates the first MAC forwarding entry in S305. For more specific descriptions, refer to S305. Details are not described herein again.

It should be noted that, after receiving the second message, the second PE device may generate the third MAC forwarding entry in the following scenarios.

Scenario 1: A local MAC route through which the MAC address included in the second MAC/IP advertisement route is reached does not exist on the second PE device. For example, when a link between the second PE device and the CE device is faulty, the local MAC route is cancelled. In this case, the second PE device may generate the third MAC forwarding entry based on the MAC address and the ESI that are included in the second MAC/IP advertisement route carried by the second PE device.

Scenario 2: When the second PE device receives the second message, and a local MAC route through which the MAC address included in the second MAC/IP advertisement route is reached exists on the second PE device, the second PE device stores routing information carried in the second message. When the local MAC route that is of the second PE device and through which the MAC address included in the second MAC/IP advertisement route is reached is cancelled because a link between the second PE device and the CE device is faulty, the second PE device generates the third MAC forwarding entry based on the routing information carried in the second message, in other words, based on the MAC address and the ESI that are included in the second MAC/IP advertisement route.

The foregoing two scenarios are merely examples. This application imposes no limitation thereto.

The second PE device generates the fourth MAC forwarding entry based on the MAC address included in the second MAC/IP advertisement route and the network address of the first PE device. The fourth MAC forwarding entry is a secondary forwarding entry used to forward a packet whose destination MAC address is the MAC address included in the second MAC/IP advertisement route, and a next hop network address included in the fourth forwarding entry is the network address of the first PE device. A manner in which the second PE device generates the fourth MAC forwarding entry is similar to the manner in which the first PE device generates the second MAC forwarding entry in S307. For more specific descriptions, refer to S307. Details are not described herein again.

In an implementation, after the second PE device generates the fourth forwarding entry, fast reroute FRR is implemented based on a local MAC forwarding entry (which may also be referred to as a fifth MAC forwarding entry, where the fifth MAC forwarding entry may be, for example, the third MAC forwarding entry, or a stored local MAC forwarding entry before the third MAC forwarding entry is generated) in which the second PE device arrives at the CE device and the fourth MAC forwarding entry.

Therefore, according to the foregoing method, when the second PE device receives known unicast traffic bound for the terminal device (a data packet whose destination MAC address is the MAC address included in the second MAC/IP advertisement route), the second PE device queries a MAC forwarding table; and when the second link normally works, directly forwards the packet to the CE device over the second link according to an instruction of a local MAC forwarding entry (for example, the third MAC forwarding entry). When the second link is faulty, after the second PE device receives the known unicast traffic bound for the terminal device (the data packet whose destination MAC address is the MAC address included in the second MAC/IP advertisement route), the second PE device queries the MAC forwarding table, and forwards the traffic to the first PE device according to an instruction of a secondary forwarding entry, in other words, according to an instruction of the fourth MAC forwarding entry, and the first PE device forwards the traffic to the CE device, thereby increasing a failure convergence speed.

It should be noted that the method 300 in this application may include both S306 to S308 and S309 to S312, and there is no execution sequence of S306 to S308 and S309 to S312.

In this embodiment of this application, after the link from the second PE device to the CE device is faulty, a MAC route through which the second PE device reaches the MAC address included in the first MAC/IP advertisement route is unreachable. In this case, the second PE device sends a MAC route cancel message to the first PE device, to cancel the first MAC/IP advertisement route. After receiving the MAC route cancel message sent by the second PE device, the first PE device does not immediately delete the first MAC/IP advertisement route, and instead, the first PE device starts an aging timer. The first MAC/IP advertisement route is deleted if no updated MAC route through which the CE device is reached is received after the aging timer expires. Therefore, the following case may be avoided: After receiving the MAC route cancel message sent by the second PE device, the first PE device sends a MAC route cancel message to a remote PE device, for example, a third PE device PE 2 shown in FIG. 2. Consequently, a local MAC route on the second PE device is cancelled due to an interface fault. After the first PE device notifies that a remote MAC route is cancelled, no MAC route through which the CE device is reached exists on the second PE device. In this case, if traffic sent by the PE 2 reaches the second PE device, the second PE device cannot forward the traffic because the second PE device cannot find the MAC forwarding table.

With reference to FIG. 2 to FIG. 7, the foregoing describes the packet processing method in detail according to the embodiments of this application. With reference to FIG. 8 to FIG. 15, the following describes in detail a provider edge PE device and a system that are used for packet processing according to embodiments of this application.

Figure 8:
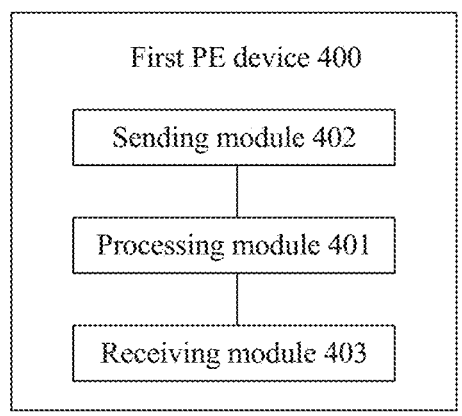
FIG. 8 is a schematic structural diagram of a first PE device according to an embodiment of this application.

FIG. 8 is a schematic diagram of a second PE device 400 according to an embodiment of this application. The second PE device 400 may be the PE 1-1 in FIG. 2 and be configured to perform steps performed by the second PE in the embodiment shown in FIG. 3, FIG. 6, or FIG. 7. A customer edge CE device is connected to a first interface of the first PE device over a first link, and the CE device is connected to a second interface of the second PE device over a second link. As shown in FIG. 8, the second PE device 400 includes a processing module 401 and a sending module 402.

The processing module 401 is configured to generate a first message, where the first message carries a first MAC/IP advertisement route through which the CE device is reached, the first MAC/IP advertisement route includes a MAC address and an ESI used to identify an ES, the MAC address is a MAC address of the CE device or a MAC address of a terminal device on an Ethernet virtual private network (EVPN) managed by the CE device, and the ES includes the first link and the second link.

The sending module 402 is configured to send the first message to the first PE device. The first MAC/IP advertisement route is used by the first PE device to generate a first MAC forwarding entry, the first MAC forwarding entry includes the MAC address included in the first MAC/IP advertisement route, an outbound interface identifier included in the first MAC forwarding entry is an identifier of the first interface, and the first MAC forwarding entry is used by the first PE device to forward, to the CE device, a packet whose destination MAC address is the MAC address included in the first MAC/IP advertisement route.

In the foregoing technical solution, when the first PE device does not learn, from the CE device, a MAC route through which the MAC address included in the first MAC/IP advertisement route is reached, the second PE device notifies the first PE device of the MAC route through which the MAC address included in the first MAC/IP advertisement route is reached. The first PE device may generate the first MAC forwarding entry based on the received MAC route. When receiving a data stream whose destination MAC address is the MAC address included in the first MAC/IP advertisement route, the first PE device may forward the data stream to the CE device over the first link based on the first MAC forwarding entry. In the foregoing technical solution, when a CE device is multi-homed to a plurality of PE devices in a multi-active manner, the plurality of PE devices can effectively share load, thereby properly utilizing bandwidth resources.

In an implementation, the first message is a first Border Gateway Protocol update BGP update message. For a more specific format of the first BGP update message (for example, fields to be used), refer to descriptions of corresponding parts in the foregoing method embodiments. Details are not described herein again.

In an implementation, the second PE device 400 further includes a receiving module 403. After the sending module sends the first message to the first PE device, the receiving module 403 is configured to receive a second message sent by the first PE device. The second message carries a second MAC/IP advertisement route and a next hop network address. The second MAC/IP advertisement route includes a destination MAC address and the ESI. The destination MAC address in the second MAC/IP advertisement route is the MAC address included in the first MAC/IP advertisement route. The next hop network address carried in the second message is a network address of the first PE device. The ESI is used by the second PE device to determine that an interface through which the second PE device is connected to the CE device is the second interface. The determined second interface and the MAC address included in the second MAC/IP advertisement route are used by the second PE device to generate a third MAC forwarding entry. The third MAC forwarding entry includes the MAC address included in the second MAC/IP advertisement route, an outbound interface identifier included in the third forwarding entry is an identifier of the second interface, and the third MAC forwarding entry is used by the second PE device to forward a packet whose destination MAC address is the MAC address included in the second MAC/IP advertisement route.

The processing module 401 is further configured to generate a fourth MAC forwarding entry based on the MAC address included in the first MAC/IP advertisement route and the network address of the first PE device. The fourth MAC forwarding entry includes the MAC address included in the first MAC/IP advertisement route, and a next hop network address included in the fourth MAC forwarding entry is the network address of the first PE device. When the second link is faulty, the fourth MAC forwarding entry is used by the second PE device to forward a packet whose destination MAC address is the MAC address included in the second MAC/IP advertisement route.

After the second PE device generates the third forwarding entry and the fourth forwarding entry, fast reroute FRR is implemented based on the local MAC forwarding entry (which may also be referred to as a fifth MAC forwarding entry, where the fifth MAC forwarding entry may be, for example, the third MAC forwarding entry, or a stored local MAC forwarding entry before the third MAC forwarding entry is generated) and the fourth MAC forwarding entry. When the second PE device receives known unicast traffic bound for the terminal device (a data packet whose destination MAC address is the MAC address of the terminal device), the second PE device queries a MAC forwarding table; and when the second link normally works, directly forwards the packet to the CE device over the second link according to an instruction of the third MAC forwarding entry. When the second link is faulty, after the second PE device receives the known unicast traffic bound for the terminal device (the data packet whose destination MAC address is the MAC address included in the second MAC/IP advertisement route), the second PE device queries the MAC forwarding table, and forwards the traffic to the first PE device according to an instruction of a secondary forwarding entry, in other words, according to an instruction of the fourth MAC forwarding entry, and the first PE device forwards the traffic to the CE device, thereby increasing a failure convergence speed.

In an implementation, the second message further carries instruction information. The processing module 401 is further configured such that after the receiving module receives the second message sent by the first PE device, the processing module 401 skips send, to the first PE device according to the instruction information, a MAC/IP advertisement route through which the MAC address included in the second MAC/IP advertisement route is reached, to avoid a loop.

Figure 9:
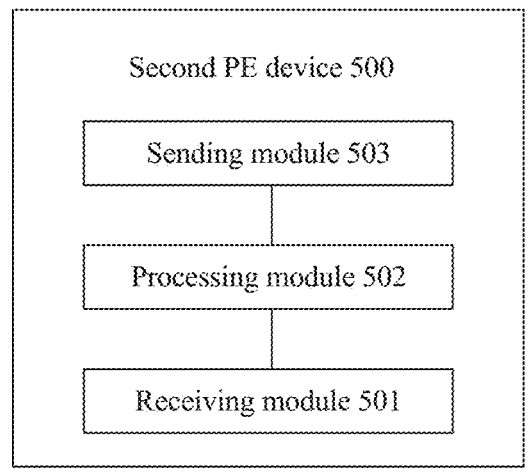
FIG. 9 is a schematic structural diagram of a second PE device according to an embodiment of this application.

FIG. 9 is a schematic diagram of a first PE device 500 according to an embodiment of this application. The first PE device 500 may be the PE 1-2 in FIG. 2 and be configured to perform steps performed by the first PE device in the embodiment shown in FIG. 3, FIG. 6, or FIG. 7. A customer edge CE device is connected to a first interface of the first PE device over a first link, and the CE device is connected to a second interface of a second PE device over a second link. As shown in FIG. 9, the first PE device 500 includes a receiving module 501 and a processing module 502.

The receiving module 501 is configured to receive a first message sent by the second PE device. The first message carries a first MAC/IP advertisement route. The first MAC/IP advertisement route includes a MAC address and an ESI used to identify an ES. The MAC address is a MAC address of the CE device or a MAC address of a terminal device on an EVPN managed by the CE device. The ES includes the first link and the second link. The processing module 502 is configured to determine, based on the ESI that an interface through which the first PE device is connected to the CE device is the first interface. The processing module 502 determines, based on the ESI carried in the first message received by the receiving module 501, that an interface through which the first PE device is connected to the CE device is the first interface.

The processing module 502 is further configured to generate a first MAC forwarding entry based on the determined first interface and the MAC address included in the first MAC/IP advertisement route. The first MAC forwarding entry includes the MAC address included in the first MAC/IP advertisement route. An outbound interface identifier included in the first MAC forwarding entry is an identifier of the first interface. The first MAC forwarding entry is used by the first PE device to forward, to the CE device, a packet whose destination MAC address is the MAC address included in the first MAC/IP advertisement route.

In the foregoing technical solution, when the first PE device does not learn, from the CE device, a MAC route through which the MAC address included in the first MAC/IP advertisement route is reached, the second PE device notifies the first PE device of the MAC route through which the MAC address included in the first MAC/IP advertisement route is reached. The first PE device may generate the first MAC forwarding entry based on the received MAC route. When receiving a data stream whose destination MAC address is the MAC address included in the first MAC/IP advertisement route, the first PE device may directly forward the data stream to the CE device over the first link based on the first MAC forwarding entry. In the foregoing technical solution, when a CE device is multi-homed to a plurality of PE devices in a multi-active manner, the plurality of PE devices can effectively share load, thereby properly utilizing bandwidth resources.

In an implementation, the first message further carries a next hop network address, and the next hop network address in the first message is a network address of the second PE device, for example, a loopback address of the second PE device. The processing module 502 is further configured to obtain the network address of the second PE device based on the first message. The processing module 502 is further configured to generate a second MAC forwarding entry based on the MAC address included in the first MAC/IP advertisement route and the network address of the second PE device. The second MAC forwarding entry includes the MAC address included in the first MAC/IP advertisement route, and a next hop network address included in the second MAC forwarding entry is the network address of the second PE device. When the first link is faulty, the second MAC forwarding entry is used by the first PE device to forward a packet whose destination MAC address is the MAC address included in the first MAC/IP advertisement route.

When the first PE device receives known unicast traffic bound for the terminal device (a data packet whose destination MAC address is the MAC address included in the first MAC/IP advertisement route), the first PE device queries a MAC forwarding table; and when the first link is in a normal working state, directly forwards the packet over the first link using the CE device according to an instruction of the first MAC forwarding entry. When the first link is faulty and the first PE device receives the known unicast traffic (the data packet whose destination MAC address is the MAC address included in the first MAC/IP advertisement route), the first PE device forwards the traffic to the second PE device according to an instruction of the second MAC forwarding entry, and the second PE device forwards the traffic to the CE device, thereby increasing a failure convergence speed.

In an implementation, the first message is a first Border Gateway Protocol update BGP update message. For a more specific format of the first BGP update message (for example, fields or extension fields to be used), refer to descriptions of corresponding parts in the foregoing method embodiments. Details are not described herein again.

In an implementation, the first PE device further includes a receiving module 503. After the receiving module receives the first message sent by the second PE device, the processing module 502 is further configured to generate a second message. The processing module 502 generates the second message based on the first message received by the receiving module 501. The second message carries a second MAC/IP advertisement route and a next hop network address, and the second MAC/IP advertisement route includes a MAC address and the ESI. The MAC address included in the second MAC/IP advertisement route is the same as the MAC address included in the first MAC/IP advertisement route. The processing module 502 obtains the MAC address included in the first MAC/IP advertisement route carried in the first message, and encapsulates the MAC address into the second MAC/IP advertisement route carried in the second message. The next hop network address carried in the second message is a network address of the first PE device.

The sending module 503 is further configured to send the second message to the second PE device, where the second message is used by the second PE device to generate a third MAC forwarding entry and a fourth MAC forwarding entry.

The third MAC forwarding entry is used by the second PE device to forward a packet whose destination MAC address is the MAC address included in the second MAC/IP advertisement route, the third MAC forwarding entry includes the MAC address included in the second MAC/IP advertisement route, and an outbound interface identifier included in the third MAC forwarding entry is an identifier of the second interface. When the second link is faulty, the fourth MAC forwarding entry is used by the second PE device to forward a packet whose destination MAC address is the MAC address included in the second MAC/IP advertisement route, the fourth MAC forwarding entry includes the MAC address included in the second MAC/IP advertisement route, and a next hop network address included in the fourth forwarding entry is the network address of the first PE device.

According to the foregoing solution, after receiving the first message, the first PE device generates, on a control plane based on information carried in the first message, a local primary MAC routing entry and a local secondary MAC routing entry that is used for fast reroute. Further, the control plane delivers the primary MAC routing entry and the secondary MAC routing entry to a forwarding plane, and generates the first MAC forwarding entry and the second MAC forwarding entry that are used for fast reroute. In addition, after receiving the first message, the first PE device generates the local first MAC forwarding entry, and then returns the local MAC route to the second PE device, such that the second PE device generates a secondary MAC routing entry used to implement fast reroute. The MAC route learned by the second PE device from the CE device may be used as a local MAC route, namely, a primary MAC route. When a link that connects the second PE device and the CE device is faulty, for example, when the second link is faulty, the local MAC route of the second PE device is cancelled. After the second link recovers, the second PE device may generate the local MAC route again based on the second MAC/IP advertisement route notified by the first PE device, to instruct to forward traffic to the CE device. Therefore, after the second link is faulty and recovers again, a route can be quickly redirected, and fast failure convergence can be implemented.

In an implementation, the second message further carries instruction information, and the instruction information is used to instruct the second PE device not to send, to the first PE device after the second PE device receives the second message, a MAC/IP advertisement route through which the MAC address included in the second MAC/IP advertisement route is reached, to avoid a packet loop.

Figure 10:
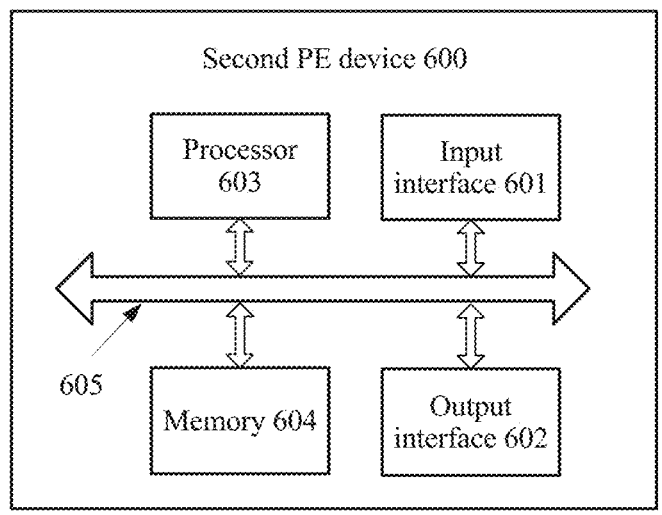
FIG. 10 is a schematic diagram of a hardware structure of a first PE device according to an embodiment of this application.

FIG. 10 is a schematic diagram of a second PE device 600 according to an embodiment of this application. The second PE device 600 may be the PE 1-1 in FIG. 2 and be configured to perform steps performed by the second PE device in the embodiment shown in FIG. 3, FIG. 6, or FIG. 7. A customer edge CE device is connected to a first interface of the first PE device over a first link, and the CE device is connected to a second interface of the second PE device over a second link. As shown in FIG. 10, the second PE device 600 includes an input interface 601, an output interface 602, a processor 603, and a memory 604. The input interface 601, the output interface 602, the processor 603, and the memory 604 may be connected to each other using a bus system 605.

The memory 604 is configured to store a program. The processor 603 is configured to execute the program in the memory 604, to control the input interface 601 to receive a signal, control the output interface 602 to send a signal, and implement steps and functions implemented by the second PE device in the implementation corresponding to FIG. 3, FIG. 6, or FIG. 7. Details are not described herein again. For implementations of the input interface 601, the output interface 602, and the processor 603, refer to descriptions of the receiving module 403, the sending module 402, and the processing module 401 in the implementation in FIG. 8. Details are not described herein again.

Figure 11:
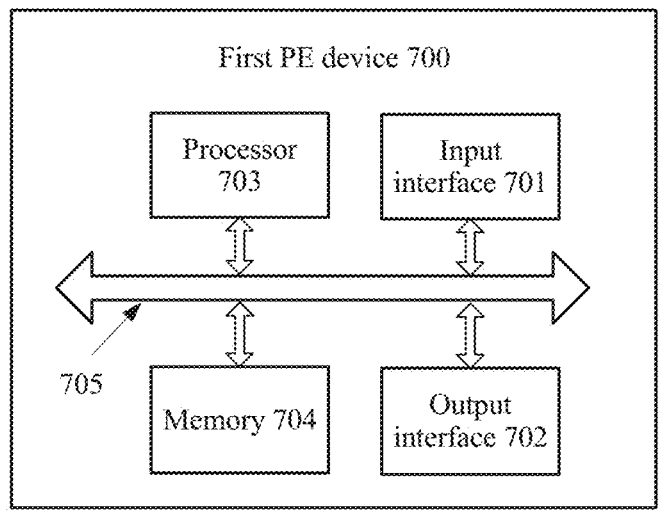
FIG. 11 is a schematic diagram of a hardware structure of a second PE device according to an embodiment of this application.

FIG. 11 is a schematic diagram of a first PE device 700 according to an embodiment of this application. The first PE device 700 may be the PE 1-2 in FIG. 2 and be configured to perform steps performed by the first PE device in the embodiment shown in FIG. 3, FIG. 6, or FIG. 7. A customer edge CE device is connected to a first interface of the first PE device over a first link, and the CE device is connected to a second interface of a second PE device over a second link. As shown in FIG. 11, the first PE device 700 includes an input interface 701, an output interface 702, a processor 703, and a memory 704. The input interface 701, the output interface 702, the processor 703, and the memory 704 may be connected to each other using a bus system 705.

The memory 704 is configured to store a program. The processor 703 is configured to execute the program in the memory 704, in order to control the input interface 701 to receive a signal, control the output interface 702 to send a signal, and implement steps and functions implemented by the first PE device in the implementation corresponding to FIG. 3, FIG. 6, or FIG. 7. Details are not described herein again. For implementations of the input interface 701, the output interface 702, and the processor 703, refer to descriptions of the receiving module 501, the sending module 503, and the processing module 502 in the implementation in FIG. 9. Details are not described herein again.

It should be understood that, in the embodiments of this application, the processor 703 and the processor 603 each may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 704 and the memory 604 may include a read-only memory and a random access memory, and respectively provide the processor 703 and the processor 603 with an instruction and data. A part of the memory 704 or the memory 604 may further include a nonvolatile random access memory. For example, the memory 704 or the memory 604 may further store device type information.

In addition to a data bus, the bus system 705 and the bus system 605 each may further include a power bus, a control bus, a status signal bus, and the like. However, for clarity of description, various buses are marked as the bus system in the figure.

In an implementation process, the steps in the method 300 may be respectively performed using an integrated logic circuit of hardware or an instruction in a form of software in the processor 603 and the processor 703. The steps of the positioning method disclosed with reference to the embodiments of this application may be directly performed by a hardware processor, or may be performed using a combination of hardware in the processor and a software module. A software module may be located in a mature storage medium in the art, such as a random access memory, a flash memory, a read-only memory, a programmable read-only memory, an electrically erasable programmable memory, or a register. The storage medium is separately located in the memory 604 and the memory 704. The processor 603 reads information in the memory 604, and the processor 703 reads information in the memory 704. The steps in the method 300 are completed in combination with the hardware of the processor 603 and the processor 703. To avoid repetition, details are not described herein again.

It should be noted that, in an implementation, the processing module 401 in FIG. 8 may be implemented by the processor 603 in FIG. 10, the sending module 402 may be implemented by the output interface 602 in FIG. 10, and the receiving module 403 may be implemented by the input interface 601 in FIG. 10. Likewise, the processing module 502 in FIG. 9 is implemented by the processor 703 in FIG. 11, the sending module 503 may be implemented by the output interface 702 in FIG. 11, and the receiving module 501 may be implemented by the input interface 701 in FIG. 11.

It can be understood that FIG. 8 to FIG. 11 show only simplified designs of the first PE device and the second PE device. In an actual application, the first PE device and the second PE device each may include any quantity of interfaces, processors, memories, and the like.

Figure 12:
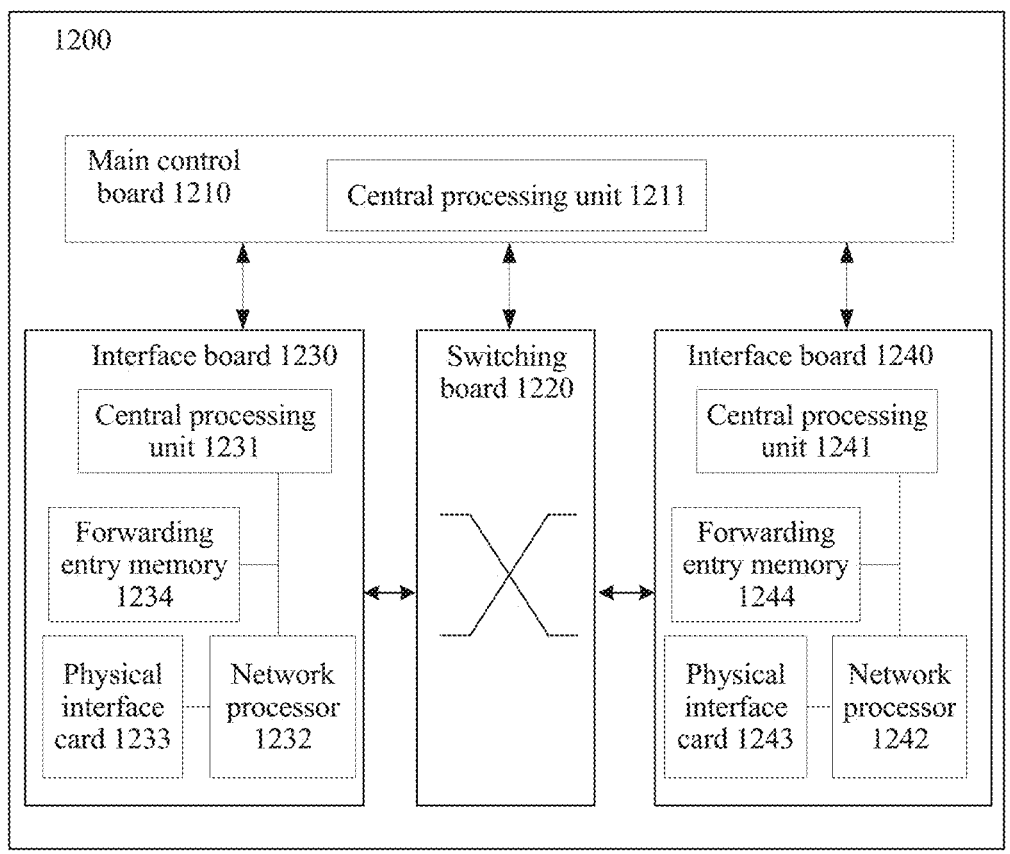
FIG. 12 is a schematic structural diagram of a second PE device according to an embodiment of this application.

FIG. 12 is a schematic diagram of a hardware structure of another second PE device 1200 according to an embodiment of this application. The second PE device 1200 shown in FIG. 12 may be configured to perform corresponding steps performed by the second PE device in the method of the foregoing embodiment.

As shown in FIG. 12, the second PE device includes a main control board 1210, an interface board 1230, a switching board 1220, and an interface board 1240. The main control board 1210 is configured to complete functions such as system management, device maintenance, and protocol processing. The switching board 1220 is configured to exchange data between interface boards (the interface board is also referred to as a line card or a service board). The interface board 1230 and the interface board 1240 are configured to provide various service interfaces (for example, a point of synchronization (POS) interface, a gigabit Ethernet (GE) interface, and an asynchronous transfer mode (ATM) interface) and implement data packet forwarding. Using a system bus, the main control board 1210, the interface board 1230, the interface board 1240, and the switching board 1220 are connected to a platform backboard for interworking. A central processing unit 1231 on the interface board 1230 is configured to: control and manage the interface board; and communicate with a central processing unit on the main control board.

The central processing unit 1211 on the main control board 1210 generates a first message, and sends, using a central processing unit on the interface board 1230, the first message to a first PE device connected to a physical interface card 1233. The first message carries a first MAC/IP advertisement route, the first MAC/IP advertisement route includes a MAC address and an ESI used to identify an ES. The MAC address included in the first MAC/IP advertisement route is a MAC address of the CE device or a MAC address of a terminal device managed by the CE device. The ES includes the first link and the second link. The first MAC/IP advertisement route is used by the first PE device to generate a first MAC forwarding entry, the first MAC forwarding entry includes the MAC address included in the first MAC/IP advertisement route, and an outbound interface identifier included in the first MAC forwarding entry is an identifier of the first interface. The first MAC forwarding entry is used by the second PE device to forward, to the CE device, a packet whose destination MAC address is the MAC address included in the first MAC/IP advertisement route.

The central processing unit 1211 on the main control board 1210 is further configured to obtain, from the physical interface card 1233 on the interface board 1230, a second message sent by the first PE device. The second message carries a second MAC/IP advertisement route and a next hop network address, and the second MAC/IP advertisement route includes a destination MAC address and the ESI. The destination MAC address in the second MAC/IP advertisement route is the MAC address included in the first MAC/IP advertisement route. The next hop network address carried in the second message is a network address of the first PE device. The ESI is used by the second PE device to determine that an interface through which the second PE device is connected to the CE device is the second interface. The determined second interface and the MAC address included in the second MAC/IP advertisement route are used by the second PE device to generate a third MAC forwarding entry. The third MAC forwarding entry includes the MAC address included in the second MAC/IP advertisement route, and an outbound interface identifier included in the third forwarding entry is an identifier of the second interface. The third MAC forwarding entry is used by the first PE device to forward a packet whose destination MAC address is the MAC address included in the second MAC/IP advertisement route.

The central processing unit 1211 on the main control board 1210 determines, based on the ESI, that an interface through which the second PE device is connected to the CE device is the second interface, and generates the third MAC forwarding entry based on the determined second interface and the MAC address included in the second MAC/IP advertisement route. The central processing unit 1211 on the main control board 1210 sends the third MAC forwarding entry to a forwarding entry memory 1234 on the interface board 1230 using the central processing unit 1231 on the interface board 1230.

The forwarding entry memory 1234 on the interface board 1230 is configured to store the third MAC forwarding entry. The central processing unit 1231 on the interface board 1230 is configured to control a network memory 1232 to obtain a MAC forwarding entry in the forwarding entry memory 1234. In addition, the central processing unit 1231 is configured to control the network memory 1232 to receive and forward traffic using the physical interface card 1233.

It should be understood that an operation on the interface board 1240 is consistent with an operation on the interface board 1230 in this embodiment of this application. For brevity, details are not described again. It should be understood that the second PE device 1200 in this embodiment may correspond to functions and/or steps implemented in the foregoing method embodiments. For brevity, details are not described herein again.

In addition, it should be noted that, in this application, the first PE device may have a same structure as the second PE device. The PE device may include one or more main control boards, and the plurality of main control boards may include a primary main control board and a secondary main control board. There may be one or more interface boards, and the second PE device with a stronger data processing capability provides more interface boards. There may be one or more physical interface cards on the interface board. There may be no switching board, or there may be one or more switching boards. When there are a plurality of switching boards, load sharing and redundancy backup may be jointly implemented. In a centralized forwarding architecture, the PE device may not need a switching board, and the interface board is responsible for a service data processing function of an entire system. In a distributed forwarding architecture, the PE device may include at least one switching board, and data is exchanged between a plurality of interface boards using the switching board, to provide a large-capacity data exchange and processing capability. Therefore, a data access and processing capability of a PE device of a distributed architecture is better than that of a device of a centralized architecture. Use of a specific architecture depends on a specific networking deployment scenario. No limitation is imposed herein.

Figure 13:
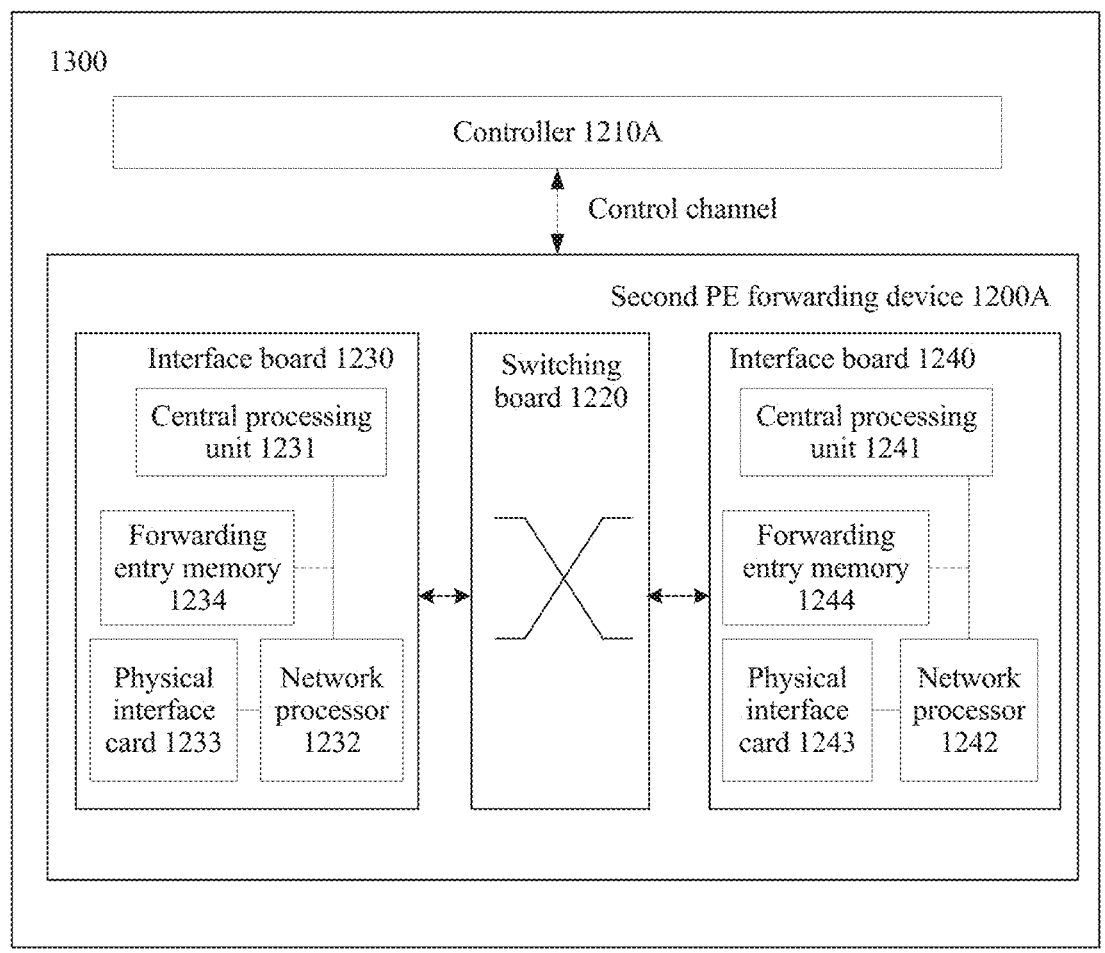
FIG. 13 is a schematic structural diagram of a second PE device according to an embodiment of this application.

FIG. 13 is a schematic diagram of a hardware structure of another second PE device 1300 according to an embodiment of this application. The second PE device 1300 shown in FIG. 13 may be configured to perform corresponding steps performed by the second PE device in the method of the foregoing embodiment.

Such a product form of the second PE device 1300 is applicable to a network architecture (for example, software-defined networking (SDN)) in which control and forwarding are separated. In the SDN, the main control board 1210 of the second PE device 1200 shown in FIG. 12 is separated from the device to form a new independent physical device (namely, a controller 1210A shown in FIG. 13), and remaining components form another independent physical device (namely, a second PE forwarding device 1200A shown in FIG. 13). The controller 1210A interacts with the second PE forwarding device 1200A using a control channel protocol. The control channel protocol may be the OpenFlow Protocol, the Path Computation Element Communication Protocol (PCEP), the BGP, the Interface to the Routing System (I2RS), or the like. In other words, the second PE device 1300 in this embodiment compared with the embodiment corresponding to FIG. 12 includes the controller 1210A and the second PE forwarding device 1200A that are separated. In other words, in this embodiment, the second PE device 1300 may also be considered as a system.

The controller 1210A may be implemented based on a general-purpose physical server or a dedicated hardware structure. In a design example, the controller includes a receiver, a processor, a transmitter, a random access memory (RAM), a read-only memory (ROM), and a bus (not shown in the figure). The processor is separately coupled to the receiver, the transmitter, the RAM, and the ROM using the bus. When the controller needs to run, a basic input/output system (BIOS) built into the ROM or a bootloader in an embedded system is used to boot the system to start, and boot the controller to enter a normal running state. After entering the normal running state, the controller runs an application and an operating system in the RAM, such that the processor performs all functions and steps of the main control board 1210 in FIG. 12.

The second PE forwarding device 1200A may be implemented based on a dedicated hardware structure. A function and a structure of the second PE forwarding device is consistent with functions and structures of the interface board 1230, the interface board 1240, and the switching board 1220 in FIG. 12, to perform corresponding functions and steps. Alternatively, the second PE forwarding device may be a virtual second PE forwarding device implemented based on the general-purpose physical server and a network functions virtualization (NFV) technology, and the virtual second PE forwarding device is a virtual router. In a scenario of the virtual second PE forwarding device, the interface board, the switching board, and the processor that are included in the foregoing physical second PE forwarding device in the embodiment of the second PE forwarding device can be considered as an interface resource, a network resource, and a processing resource that are allocated by the physical second PE forwarding device to the virtual second PE forwarding device using a general-purpose physical server in a virtual environment. For details of implementing functions or steps of the second PE forwarding device using the general-purpose physical server, or for details of implementing functions or steps of the second PE forwarding device using the general-purpose physical server and the NFV technology, refer to the embodiment in FIG. 10.

It should be understood that, in this embodiment, the controller 1210A and the second PE forwarding device 1200A in the second PE device 1300 may implement various functions and steps implemented by the second PE device in the method embodiments. For brevity, details are not described herein again.

Figure 14:
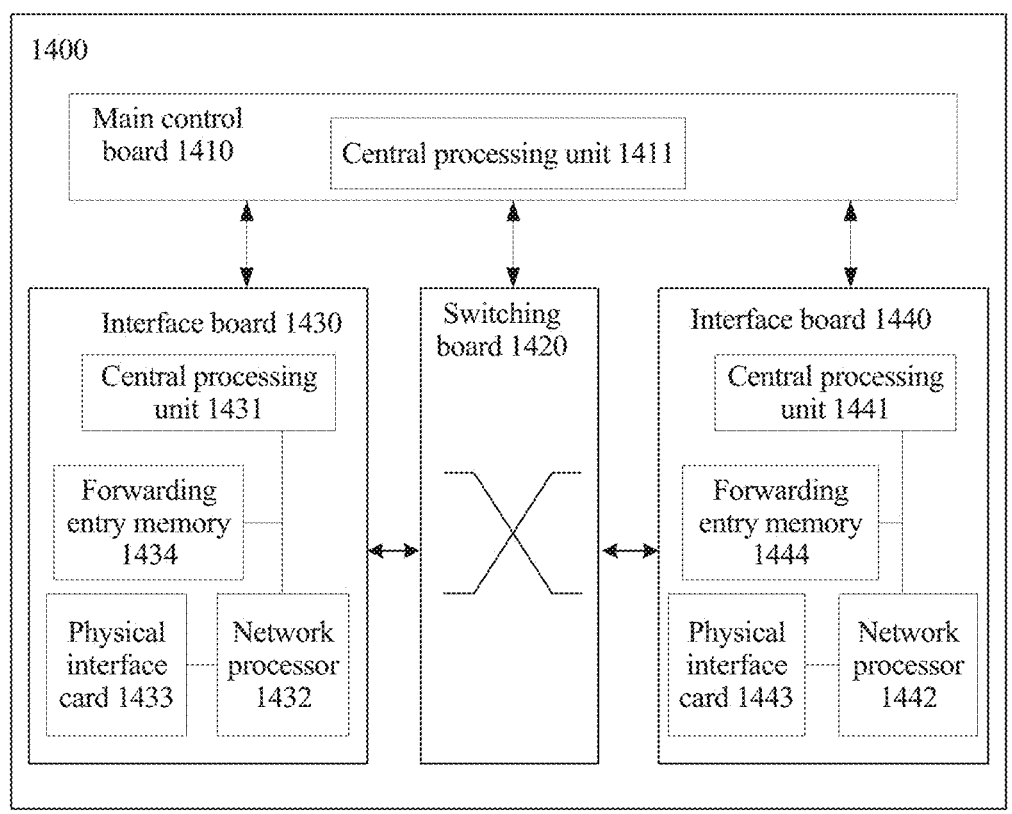
FIG. 14 is a schematic structural diagram of a first PE device according to an embodiment of this application.

FIG. 14 provides a schematic diagram of a hardware structure of another first PE device 1400 according to an embodiment of this application. The first PE device 1400 shown in FIG. 14 may be configured to perform corresponding steps performed by the first PE device in the method of the foregoing embodiment.

As shown in FIG. 14, the first PE device includes a main control board 1410, an interface board 1430, a switching board 1420, and an interface board 1440. The main control board 1410 is configured to complete functions such as system management, device maintenance, and protocol processing. The switching board 1420 is configured to exchange data between interface boards (the interface board is also referred to as a line card or a service board). The interface board 1430 and the interface board 1440 are configured to provide various service interfaces (for example, a POS interface, a GE interface, and an ATM interface) and forward a data packet. Using a system bus, the main control board 1410, the interface board 1430, the interface board 1440, and the switching board 1420 are connected to a platform backboard for interworking. A central processing unit 1431 on the interface board 1430 is configured to: control and manage the interface board; and communicate with a central processing unit on the main control board.

A physical interface card 1433 on the interface board 1430 receives a first message sent by a second PE device, where the first message carries a first MAC/IP advertisement route, the first MAC/IP advertisement route includes a MAC address and an ESI used to identify an ES. The MAC address included in the first MAC/IP advertisement route is a MAC address of the CE device or a MAC address of a terminal device managed by the CE device. The ES includes the first link and the second link. In addition, the first MAC/IP advertisement route is sent to the central processing unit 1411 on the main control board 1410 using the central processing unit 1431 on the interface board 1430.

The central processing unit 1411 on the main control board 1410 is configured to: obtain the first MAC/IP advertisement route; and determine, based on the central processing unit 1411 on the main control board 1410 and based on the ESI, that an interface through which the first PE device is connected to the CE device is the first interface. Further, the central processing unit 1411 generates a first MAC forwarding entry based on the determined first interface and the MAC address included in the first MAC/IP advertisement route. The first MAC forwarding entry includes the MAC address included in the first MAC/IP advertisement route, an outbound interface identifier included in the first MAC forwarding entry is an identifier of the first interface, and the first MAC forwarding entry is used by the second PE device to forward, to the CE device, a packet whose destination MAC address is the MAC address included in the first MAC/IP advertisement route.

The central processing unit 1411 on the main control board 1410 sends the first MAC forwarding entry to a forwarding entry memory 1434 on the interface board 1430 using the central processing unit 1431 on the interface board 1430.

The forwarding entry memory 1434 on the interface board 1430 is configured to store the first MAC forwarding entry. The central processing unit 1431 on the interface board 1430 is configured to control a network memory 1432 to obtain the MAC forwarding entry in the forwarding entry memory 1434. In addition, the central processing unit 1431 is configured to control the network memory 1432 to receive and send traffic using the physical interface card 1433.

The central processing unit 1411 on the main control board 1410 is further configured to control the interface board 1430 to forward and process traffic.

It should be understood that an operation on the interface board 1440 is consistent with an operation on the interface board 1430 in this embodiment of the present disclosure. For brevity, details are not described again. It should be understood that the first PE device 1400 in this embodiment may correspond to functions and/or steps implemented in the foregoing method embodiments. For brevity, details are not described herein again.

Figure 15:
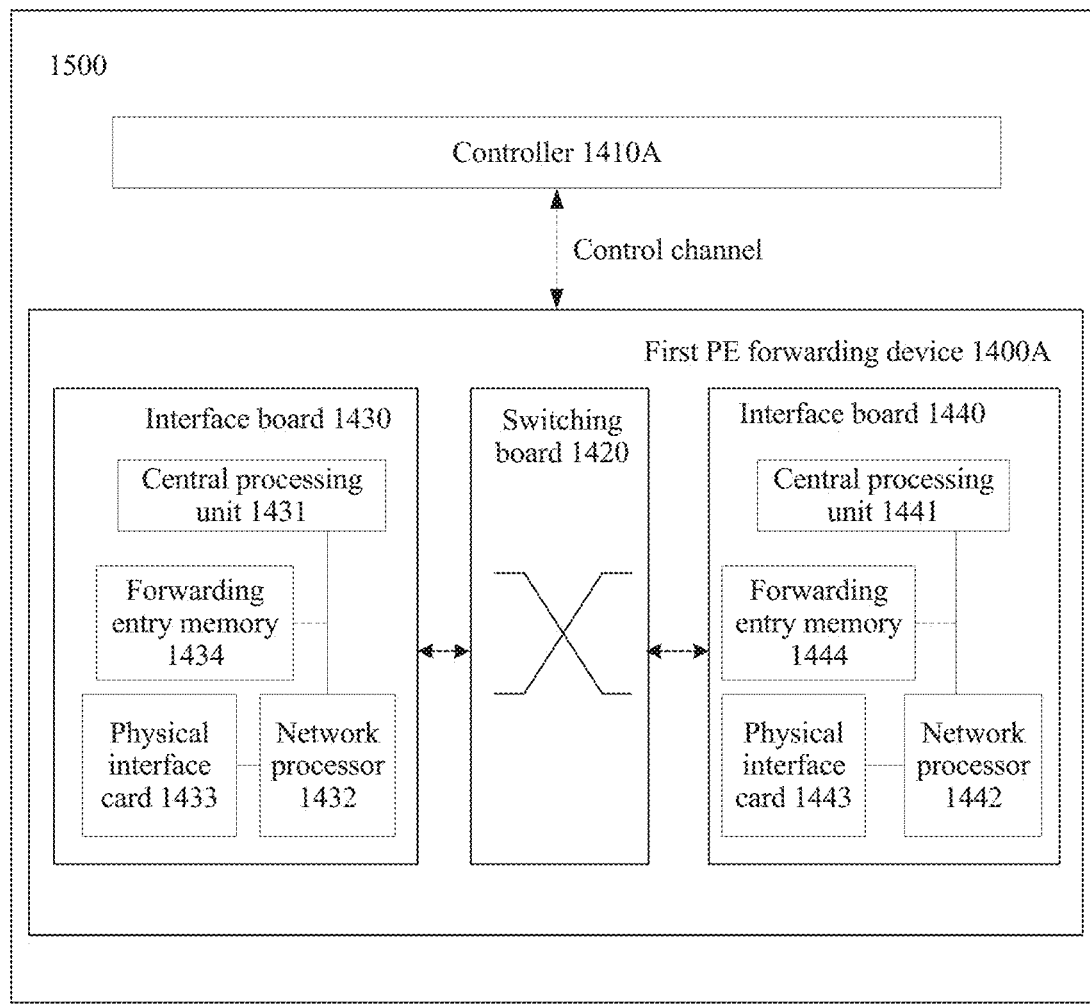
FIG. 15 is a schematic structural diagram of a first PE device according to an embodiment of this application.

FIG. 15 is a schematic diagram of a hardware structure of another first PE device 1500 according to an embodiment of this application. The first PE device 1500 shown in FIG. 15 may be configured to perform corresponding steps performed by the first PE device in the method of the foregoing embodiment.

Such a product form of the first PE device 1500 is applicable to a network architecture (for example, SDN) in which control and forwarding are separated. In the SDN, the main control board 1410 of the first PE device 1400 shown in FIG. 14 is separated from the device to form a new independent physical device (namely, a controller 1410A shown in FIG. 15), and remaining components form another independent physical device (namely, a first PE forwarding device 1400A shown in FIG. 15). The controller 1410A interacts with the first PE forwarding device 1400A using a control channel protocol. The control channel protocol may be the OpenFlow Protocol, the PCEP, the BGP, the I2RS, or the like. In other words, the first PE device 1500 in this embodiment compared with the embodiment corresponding to FIG. 14 includes the controller 1410A and the first PE forwarding device 1400A that are separated. In other words, in this embodiment, the first PE device 1500 may also be considered as a system.

The controller 1410A may be implemented based on a general-purpose physical server or a dedicated hardware structure. In a design example, the controller includes a receiver, a processor, a transmitter, a RAM, a ROM, and a bus (not shown in the figure). The processor is separately coupled to the receiver, the transmitter, the RAM, and the ROM using the bus. When the controller needs to run, a BIOS built into the ROM or a bootloader in an embedded system is used to boot the system to start, and boot the controller to enter a normal running state. After entering the normal running state, the controller runs an application and an operating system in the RAM, such that the processor performs all functions and steps of the main control board 1410 in FIG. 14.

The first PE forwarding device 1400A may be implemented based on a dedicated hardware structure. A function and a structure of the first PE forwarding device is consistent with functions and structures of the interface board 1430, the interface board 1440, and the switching board 1420 in FIG. 14, in order to perform corresponding functions and steps. Alternatively, the first PE forwarding device may be a virtual first PE forwarding device implemented based on the general-purpose physical server and a network functions virtualization (NFV) technology, and the virtual first PE forwarding device is a virtual router. In a scenario of the virtual first PE forwarding device, the interface board, the switching board, and the processor that are included in the foregoing physical first PE forwarding device in the embodiment of the first PE forwarding device can be considered as an interface resource, a network resource, and a processing resource that are allocated by the physical first PE forwarding device to the virtual first PE forwarding device using a general-purpose physical server in a virtual environment. For details of implementing functions or steps of the first PE forwarding device using the general-purpose physical server, or for details of implementing functions or steps of the second PE forwarding device using the general-purpose physical server and the NFV technology, refer to the embodiment in FIG. 11.

It should be understood that, in this embodiment, the controller 1410A and the first PE forwarding device 1400A in the first PE device 1500 may implement various functions and steps implemented by the first PE device in the method embodiments. For brevity, details are not described herein again.

This application further provides a communications system, including a first PE device and a second PE device. The first PE device may be the first PE device provided in the embodiment corresponding to FIG. 9, FIG. 11, FIG. 14, or FIG. 15. The second PE device may be the second PE device provided in the embodiment corresponding to FIG. 8, FIG. 10, FIG. 12, or FIG. 13. The communications system is configured to perform the method 300 in the embodiments corresponding to FIG. 2 to FIG. 7.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art can implement the described functions using different methods for each specific application.

It can be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented through software, hardware, firmware, or any combination thereof. When software is used to implement the embodiments, the embodiments may be implemented fully or partially in a form of a computer program product. The computer program product includes one or more computer instructions. When the computer program instructions are loaded and executed on a computer, the procedure or functions according to the embodiments of this application are fully or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. The embodiments in this specification are all described in a progressive manner, for same or similar parts in the embodiments, refer to these embodiments, and each embodiment focuses on a difference from other embodiments. Particularly, apparatus and system embodiments are basically similar to a method embodiment, and therefore are described briefly; for related parts, refer to partial descriptions in the method embodiment.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing method applied to an Ethernet virtual private network (EVPN) in which a customer edge (CE) device is connected to a first interface of a first provider edge (PE) device over a first link, wherein the CE device is connected to a second interface of a second PE device over a second link, and wherein the method comprises:
   receiving, by the first PE device, a first message from the second PE device, wherein the first message carries a first media access control/Internet Protocol (MAC/IP) advertisement route, wherein the first MAC/IP advertisement route comprises a first MAC address and an Ethernet segment identifier (ESI) identifying an Ethernet segment (ES), wherein the first MAC address is of the CE device or of a terminal device managed by the CE device, and wherein the ES comprises the first link and the second link;
   generating, by the first PE device based on the first MAC/IP advertisement route, a first MAC forwarding entry comprising an outbound interface identifier identifying the first interface and the first MAC address; and
   using, by the first PE device, the first MAC forwarding entry to forward, to the CE device, a packet whose destination MAC address is the first MAC address.

2. The method according to claim 1, wherein the first message further carries a network address of the second PE device, and wherein the method further comprises:
   obtaining, by the first PE device, the network address of the second PE device based on the first message; and
   generating, by the first PE device, a second MAC forwarding entry based on the first MAC address and the network address of the second PE device, wherein the second MAC forwarding entry comprises the first MAC address and a second outbound interface identifier identifying a third interface of the first PE device, wherein the third interface is an interface between the first PE device and the second PE device, and wherein the second MAC forwarding entry is used as a backup entry to forward a packet whose destination MAC address is the first MAC address when the first link is faulty.

3. The method according to claim 2, wherein after receiving, by the first PE device, a first message from the second PE device, the method further comprises:
   generating, by the first PE device, a second message, wherein the second message carries a second MAC/IP advertisement route, wherein the second MAC/IP advertisement route comprises a second MAC address and the ESI, wherein the second MAC address is the same as the first MAC address; and
   sending, by the first PE device, the second message to the second PE device.

4. The method according to claim 1, wherein the first message is a first Border Gateway Protocol (BGP) update message.

5. The method according to claim 4, wherein after receiving, by the first PE device, the first message from the second PE device, the method further comprises:
   generating, by the first PE device, a second message, wherein the second message carries a second MAC/IP advertisement route, wherein the second MAC/IP advertisement route comprises a second MAC address and the ESI, wherein the second MAC address is the same as the first MAC address; and
   sending, by the first PE device, the second message to the second PE device.

6. The method according to claim 1, wherein after receiving, by the first PE device, the first message from the second PE device, the method further comprises:
   generating, by the first PE device, a second message, wherein the second message carries a second MAC/IP advertisement route, wherein the second MAC/IP advertisement route comprises a second MAC address and the ESI, wherein the second MAC address is the same as the first MAC address; and
   sending, by the first PE device, the second message to the second PE device.

7. The method according to claim 6, wherein the second message further carries instruction information, and wherein the instruction information instructs the second PE device not to send, to the first PE device after the second PE device receives the second message, a MAC/IP advertisement route through which the second MAC address is reached.

8. A first provider edge (PE) device in an Ethernet virtual private network (EVPN) in which a customer edge (CE) device is connected to a first interface of the first PE device over a first link, wherein the CE device is connected to a second interface of a second PE device over a second link, and wherein the first PE device comprises:
   a receiver configured to receive a first message from the second PE device, wherein the first message carries a first media access control/Internet Protocol (MAC/IP) advertisement route, wherein the first MAC/IP advertisement route comprises a first MAC address and an Ethernet segment identifier (ESI) to identify an Ethernet segment (ES), wherein the first MAC address is of the CE device or of a terminal device managed by the CE device, and wherein the ES comprises the first link and the second link;
   a processor coupled to the receiver; and
   a memory storing a program comprising instructions to be executed in the processor such that when executed, cause the first PE device to:
   generate, based on the first MAC/IP advertisement route, a first MAC forwarding entry comprising an outbound interface identifier identifying the first interface and the first MAC address; and
use the first MAC forwarding entry to forward, to the CE device, a packet whose destination MAC address is the first MAC address.

9. The first PE device according to claim 8, wherein the first message further carries a network address of the second PE device, and wherein the instructions further cause the first PE device to:
obtain the network address of the second PE device based on the first message; and
generate a second MAC forwarding entry based on the first MAC address and the network address of the second PE device, wherein the second MAC forwarding entry comprises the first MAC address and a second outbound interface identifier identifying a third interface of the first PE device, wherein the third interface is an interface between the first PE device and the second PE device, and wherein the second MAC forwarding entry is used as a backup entry to forward a packet whose destination MAC address is the first MAC address when the first link is faulty.

10. The first PE device according to claim 9, wherein the instructions further cause the first PE device to generate a second message after the receiver receives the first message from the second PE device, wherein the second message carries a second MAC/IP advertisement route, wherein the second MAC/IP advertisement route comprises a second MAC address and the ESI, wherein the second MAC address is the same as the first MAC address, and wherein the first PE device further comprises a transmitter configured to send the second message to the second PE device.

11. The first PE device according to claim 8, wherein the instructions further cause the first PE device to generate a second message after the receiver receives the first message from the second PE device, wherein the second message carries a second MAC/IP advertisement route, wherein the second MAC/IP advertisement route comprises a second MAC address and the ESI, wherein the second MAC address is the same as the first MAC address, and wherein the first PE device further comprises a transmitter configured to send the second message to the second PE device.

12. The first PE device according to claim 11, wherein the second message further carries instruction information, and wherein the instruction information instructs the second PE device not to send, to the first PE device after the second PE device receives the second message, a MAC/IP advertisement route through which the second MAC address is reached.

13. A non-transitory computer medium applied to an Ethernet virtual private network (EVPN) in which a customer edge (CE) device is connected to a first interface of a first provider edge (PE) device over a first link, wherein the CE device is connected to a second interface of a second PE device over a second link, and wherein the non-transitory computer medium stores instructions executable by a processor of the first PE device such that when executed, cause the first PE device to implement a method comprising:
receiving a first message from the second PE device, wherein the first message carries a first media access control/Internet Protocol (MAC/IP) advertisement route, wherein the first MAC/IP advertisement route comprises a first MAC address and an Ethernet segment identifier (ESI) to identify an Ethernet segment (ES), wherein the first MAC address is of the CE device or of a terminal device managed by the CE device, and wherein the ES comprises the first link and the second link;
generating, based on the first MAC/IP advertisement route, a first MAC forwarding entry comprising an outbound interface identifier identifying the first interface and the first MAC address; and
using the first MAC forwarding entry to forward, to the CE device, a packet whose destination MAC address is the first MAC address.

14. The non-transitory computer medium according to claim 13, wherein the first message further carries a network address of the second PE device, and wherein the method further comprises:
obtaining the network address of the second PE device based on the first message; and
generating a second MAC forwarding entry based on the first MAC address and the network address of the second PE device, wherein the second MAC forwarding entry comprises the first MAC address and a second outbound interface identifier identifying a third interface of the first PE device, wherein the third interface is an interface between the first PE device and the second PE device, wherein a next hop network address in the second MAC forwarding entry is the network address of the second PE device, and wherein the second MAC forwarding entry is used as a backup entry to forward a packet whose destination MAC address is the first MAC address when the first link is faulty.

15. The non-transitory computer medium according to claim 14, wherein after receiving, by the first PE device, a first message from the second PE device, the method further comprises:
generating a second message, wherein the second message carries a second MAC/IP advertisement route, wherein the second MAC/IP advertisement route comprises a second MAC address and the ESI, and wherein the second MAC address is the same as the first MAC address; and
sending the second message to the second PE device.

16. The non-transitory computer medium according to claim 13, wherein the first message is a first Border Gateway Protocol (BGP) update message.

17. The non-transitory computer medium according to claim 16, wherein after receiving the first message from second PE device, the method further comprises:
generating a second message, wherein the second message carries a second MAC/IP advertisement route, wherein the second MAC/IP advertisement route comprises a second MAC address and the ESI, wherein the second MAC address is the same as the first MAC address; and
sending the second message to the second PE device.

18. The non-transitory computer medium according to claim 13, wherein after receiving the first message from the second PE device, the method further comprises:
generating a second message, wherein the second message carries a second MAC/IP advertisement route, wherein the second MAC/IP advertisement route comprises a second MAC address and the ESI, wherein the second MAC address is the same as the first MAC address; and
sending, by the first PE device, the second message to the second PE device.

19. The non-transitory computer medium according to claim 18, wherein the second message further carries instruction information, and wherein the instruction information instructs the second PE device not to send, to the first PE device after the second PE device receives the second message, a MAC/IP advertisement route through which the second MAC address is reached.

20. A system applied to an Ethernet virtual private network (EVPN), the system comprising:
a customer edge (CE) device;
a first provider edge (PE) device comprising a first interface connected to the CE device over a first link; and
a second PE device comprising a second interface connected to the CE device over a second link,
wherein the first PE device comprises:
a receiver configured to receive a first message from the second PE device, wherein the first message carries a first media access control/Internet Protocol (MAC/IP) advertisement route, wherein the first MAC/IP advertisement route comprises a first MAC address and an Ethernet segment identifier (ESI) to identify an Ethernet segment (ES), wherein the first MAC address is of the CE device or of a terminal device managed by the CE device, and wherein the ES comprises the first link and the second link;
a processor coupled to the receiver; and
a memory storing instructions to be executed by the processor such that when executed, cause the first PE device to:
generate, based on the first MAC/IP advertisement route, a first MAC forwarding entry comprising an outbound interface identifier identifying the first interface and the first MAC address; and
use the first MAC forwarding entry to forward, to the CE device, a packet whose destination MAC address is the first MAC address.

21. The system according to claim 20, wherein the first message further carries a network address of the second PE device, and wherein the instructions further cause the first PE device to:
obtain the network address of the second PE device based on the first message; and
generate a second MAC forwarding entry based on the first MAC address and the network address of the second PE device, wherein the second MAC forwarding entry comprises the first MAC address and a second outbound interface identifier identifying a third interface of the first PE device, wherein the third interface is an interface between the first PE device and the second PE device, and wherein the second MAC forwarding entry is used as a backup entry to forward a packet whose destination MAC address is the first MAC address when the first link is faulty.

22. The system according to claim 20, wherein the instructions further cause the first PE device to generate a second message after the receiver receives the first message from the second PE device, wherein the second message carries a second MAC/IP advertisement route, wherein the second MAC/IP advertisement route comprises a second MAC address and the ESI, wherein the second MAC address is the same as the first MAC address, and wherein the first PE device further comprises a transmitter configured to send the second message to the second PE device.

23. The system according to claim 22, wherein the second PE device comprises:
a second receiver configured to receive the second message;
a second processor coupled to the second receiver; and
a second memory storing second instructions to be executed by the second processor such that when executed, cause the second PE device to generate a third MAC forwarding entry, wherein the third MAC forwarding entry comprises the first MAC address and a second outbound interface identifier identifying the second interface.

* * * * *